(12) United States Patent
Merkley et al.

(10) Patent No.: US 7,815,841 B2
(45) Date of Patent: Oct. 19, 2010

(54) FIBER CEMENT COMPOSITE MATERIALS USING SIZED CELLULOSE FIBERS

(75) Inventors: Donald J. Merkley, Alta Loma, CA (US); Caidian Luo, Alta Loma, CA (US)

(73) Assignee: James Hardie Technology Limited, Dublin (IE)

( * ) Notice: Subject to any disclaimer, the term of this patent is extended or adjusted under 35 U.S.C. 154(b) by 885 days.

(21) Appl. No.: 10/757,330

(22) Filed: Jan. 13, 2004

(65) Prior Publication Data

US 2004/0145078 A1 Jul. 29, 2004

Related U.S. Application Data

(62) Division of application No. 09/969,742, filed on Oct. 2, 2001, now Pat. No. 6,676,745.

(60) Provisional application No. 60/237,850, filed on Oct. 4, 2000, provisional application No. 60/237,783, filed on Oct. 4, 2000, provisional application No. 60/241,212, filed on Oct. 17, 2000.

(51) Int. Cl.
   *B28B 3/02* (2006.01)
   *B28B 3/22* (2006.01)
(52) U.S. Cl. .................... 264/333; 103/731
(58) Field of Classification Search .............. 264/333; 106/726, 731
   See application file for complete search history.

(56) References Cited

U.S. PATENT DOCUMENTS

| | | | |
|---|---|---|---|
| 1,571,048 A | | 1/1926 | Garrow |
| 1,914,163 A | * | 6/1933 | Randall ................ 162/183 |
| 2,024,689 A | * | 12/1935 | Groombridge et al. ........ 162/77 |

(Continued)

FOREIGN PATENT DOCUMENTS

AR 014702 A1 12/2005

(Continued)

OTHER PUBLICATIONS

Rozman, H.D., H.P.S. Abdul Khalil, R.N. Kumar, A. Abusamah, B.K. Kon, Improvements of Fibreboard Properties through Fibre Activation with Silane, Intern. J. Polymeric Mater., vol. 32 (1996) pp. 247-257.*

(Continued)

*Primary Examiner*—Matthew J. Daniels
(74) *Attorney, Agent, or Firm*—Gardere Wynne Sewell, LLP

(57) ABSTRACT

This invention discloses a new technology related to cellulose fiber reinforced cement composite materials using cellulose fibers that are treated with inorganic and/or organic resins to make the fibers more hydrophobic, as well as other chemical treatments. This invention discloses four aspects of the technology: fiber treatment, formulations, methods and the final product. This technology advantageously provides fiber cement building materials with the desirable characteristics of reduced water absorption, reduced rate of water absorption, lower water migration, and lower water permeability. This invention also impart the final products improved freeze-thaw resistance, reduced efflorescence, and improved rot and UV resistances, compared to conventional fiber cement products. These improved attributes are gained without loss in dimensional stability, strength, strain or toughness. In some cases the physical and mechanical properties are improved. This invention also discloses the method of treating cellulose fibers with various chemicals to impart the fiber hydrophobicity for applications in the fiber reinforced cement composite materials.

5 Claims, 7 Drawing Sheets

U.S. PATENT DOCUMENTS

| | | | |
|---|---|---|---|
| 2,030,383 A | 2/1936 | Luth et al. | |
| 2,054,854 A | 9/1936 | Dreyfus | |
| 2,156,308 A | 5/1939 | Schuh | |
| 2,156,311 A | 5/1939 | Schuh | |
| 2,175,568 A | 10/1939 | Haustein | |
| 2,175,569 A | 10/1939 | Kennedy | |
| 2,176,668 A | 10/1939 | Egegberg et al. | |
| 2,377,484 A | 6/1945 | Elmendorf | |
| 2,645,576 A | 7/1953 | Bate et al. | |
| 2,880,101 A * | 3/1959 | Ulfstedt | 106/641 |
| 3,264,125 A | 8/1966 | Bourlin | |
| 3,716,386 A | 2/1973 | Kempster | |
| 3,748,100 A | 7/1973 | Forseth | |
| 3,748,160 A | 7/1973 | Carbajal | |
| 3,753,749 A | 8/1973 | Nutt | |
| 3,836,412 A | 9/1974 | Boustany et al. | |
| 3,843,380 A | 10/1974 | Beyn | |
| 3,865,779 A | 2/1975 | Oya et al. | |
| 3,918,981 A | 11/1975 | Long | |
| 3,931,069 A | 1/1976 | Lundin | |
| 3,969,567 A | 7/1976 | Occleshaw et al. | |
| 3,998,944 A | 12/1976 | Long | |
| 4,003,752 A | 1/1977 | Isohata et al. | |
| 4,013,480 A | 3/1977 | Chumbley et al. | |
| 4,088,804 A | 5/1978 | Cornwell et al. | |
| 4,098,701 A | 7/1978 | Burrill et al. | |
| 4,102,697 A | 7/1978 | Fukuba et al. | |
| 4,138,313 A | 2/1979 | Hillstrom et al. | |
| 4,177,176 A | 12/1979 | Burrill et al. | |
| 4,225,383 A * | 9/1980 | McReynolds | 162/156 |
| 4,258,090 A | 3/1981 | Morau | |
| 4,274,913 A | 6/1981 | Kikuiri et al. | |
| 4,306,911 A | 12/1981 | Gordon et al. | |
| 4,351,867 A | 9/1982 | Mulvey et al. | |
| 4,406,703 A | 9/1983 | Guthrie et al. | |
| 4,428,775 A | 1/1984 | Johnson et al. | |
| 4,457,785 A | 7/1984 | Hsu et al. | |
| 4,486,234 A | 12/1984 | Herr | |
| 4,497,688 A | 2/1985 | Schaefer | |
| 4,510,020 A | 4/1985 | Green et al. | |
| 4,517,375 A | 5/1985 | Schmidt | |
| 4,548,676 A | 10/1985 | Johnstone et al. | |
| 4,637,860 A | 1/1987 | Harper et al. | |
| 4,643,920 A | 2/1987 | McEntee et al. | |
| 4,647,505 A | 3/1987 | Blackie et al. | |
| 4,647,509 A | 3/1987 | Wallace et al. | |
| 4,647,589 A | 3/1987 | Valone | |
| 4,655,979 A * | 4/1987 | Nakano et al. | 264/42 |
| 4,659,386 A | 4/1987 | Nagai et al. | |
| 4,738,723 A | 4/1988 | Frizzell et al. | |
| 4,766,113 A | 8/1988 | West et al. | |
| 4,806,203 A | 2/1989 | Elton | |
| 4,938,958 A | 7/1990 | Niira et al. | |
| 4,944,842 A | 7/1990 | Stromberg et al. | |
| 4,971,658 A | 11/1990 | Henricson et al. | |
| 4,985,119 A | 1/1991 | Vinson et al. | |
| 5,021,093 A | 6/1991 | Beshay | |
| 5,030,289 A | 7/1991 | Sattler et al. | |
| 5,047,086 A | 9/1991 | Hayakawa et al. | |
| 5,049,196 A | 9/1991 | Ries | |
| 5,063,260 A | 11/1991 | Chen et al. | |
| 5,102,596 A | 4/1992 | Lempfer et al. | |
| 5,118,225 A | 6/1992 | Koch et al. | |
| 5,191,456 A | 3/1993 | Sutherland et al. | |
| 5,223,090 A | 6/1993 | Klungness et al. | |
| 5,236,994 A | 8/1993 | Markusch et al. | |
| 5,346,541 A | 9/1994 | Goldman et al. | |
| 5,403,392 A | 4/1995 | Craig | |
| 5,405,498 A | 4/1995 | Pease | |
| 5,415,734 A | 5/1995 | Backlund et al. | |
| 5,421,867 A | 6/1995 | Yeager et al. | |
| 5,429,717 A | 7/1995 | Bokstrom et al. | |
| 5,432,215 A | 7/1995 | Girg et al. | |
| 5,465,547 A | 11/1995 | Jakel | |
| 5,472,486 A | 12/1995 | Dragner et al. | |
| 5,482,550 A | 1/1996 | Strait | |
| 5,520,779 A | 5/1996 | Bold | |
| 5,577,024 A | 11/1996 | Malkamaki et al. | |
| RE35,460 E | 2/1997 | Klungness et al. | |
| 5,643,359 A | 7/1997 | Soroushian et al. | |
| 5,705,542 A | 1/1998 | Roffael et al. | |
| 5,777,024 A | 7/1998 | Killilea et al. | |
| 5,786,282 A | 7/1998 | Carter et al. | |
| 5,795,515 A | 8/1998 | Fischer | |
| 5,804,003 A | 9/1998 | Nishizawa | |
| 5,866,057 A | 2/1999 | Roffael | |
| 5,871,824 A | 2/1999 | Bates | |
| 5,876,561 A | 3/1999 | Tsai | |
| 5,897,701 A | 4/1999 | Soroushian et al. | |
| 5,945,044 A | 8/1999 | Kawai et al. | |
| 5,989,335 A | 11/1999 | Soroushian et al. | |
| 6,030,447 A | 2/2000 | Naji et al. | |
| 6,045,057 A | 4/2000 | Moor et al. | |
| 6,086,998 A | 7/2000 | Wihsmann | |
| 6,138,430 A | 10/2000 | Van Acoleyen et al. | |
| 6,176,920 B1 | 1/2001 | Murphy et al. | |
| 6,228,215 B1 | 5/2001 | Hoffman, Jr. | |
| 6,245,196 B1 | 6/2001 | Martin et al. | |
| 6,325,853 B1 | 12/2001 | Hogan et al. | |
| 6,344,654 B1 | 2/2002 | Lesko | |
| 6,346,146 B1 | 2/2002 | Duselis et al. | |
| 6,346,165 B1 | 2/2002 | Markessini et al. | |
| 6,352,952 B1 | 3/2002 | Jardine et al. | |
| 6,419,788 B1 | 7/2002 | Wingerson | |
| 6,475,275 B1 | 11/2002 | Nebesnak et al. | |
| 6,488,762 B1 | 12/2002 | Shi | |
| 6,506,248 B1 | 1/2003 | Duselis et al. | |
| 6,512,132 B2 | 1/2003 | Isoda et al. | |
| 6,528,151 B1 | 3/2003 | Shah et al. | |
| 6,562,743 B1 | 5/2003 | Cook et al. | |
| 6,572,697 B2 | 6/2003 | Gleeson et al. | |
| 6,613,424 B1 | 9/2003 | Putt et al. | |
| 6,676,744 B2 | 1/2004 | Merkley et al. | |
| 6,676,745 B2 | 1/2004 | Merkley et al. | |
| 6,719,878 B1 | 4/2004 | Svedman | |
| 6,749,897 B2 | 6/2004 | Naji et al. | |
| 6,770,576 B2 | 8/2004 | Cook et al. | |
| 6,777,103 B2 | 8/2004 | Merkley et al. | |
| 6,837,452 B2 | 1/2005 | Dezutter et al. | |
| 6,872,246 B2 | 3/2005 | Merkley et al. | |
| 6,893,751 B2 | 5/2005 | Naji et al. | |
| 6,933,038 B2 | 8/2005 | Nanko et al. | |
| 6,942,726 B2 | 9/2005 | Cook et al. | |
| 7,028,436 B2 | 4/2006 | Bezubic, Jr. | |
| 7,081,184 B2 | 7/2006 | Wester et al. | |
| 7,226,525 B2 | 6/2007 | Vrbanac et al. | |
| 7,300,546 B2 | 11/2007 | Jewell et al. | |
| 7,344,593 B2 | 3/2008 | Luo et al. | |
| 7,455,727 B2 | 11/2008 | Trevethick | |
| 2002/0007926 A1 | 1/2002 | Jewell et al. | |
| 2002/0007927 A1 | 1/2002 | Vahatalo et al. | |
| 2002/0051892 A1 | 5/2002 | Laks et al. | |
| 2002/0059886 A1 | 5/2002 | Merkley et al. | |
| 2002/0069791 A1 | 6/2002 | Merkley et al. | |
| 2002/0088584 A1 | 7/2002 | Merkley et al. | |
| 2002/0112827 A1 | 8/2002 | Merkley et al. | |
| 2002/0121229 A1 | 9/2002 | Jardine et al. | |
| 2002/0170466 A1 | 11/2002 | Naji et al. | |
| 2002/0170467 A1 | 11/2002 | Naji et al. | |
| 2002/0170468 A1 | 11/2002 | Luo et al. | |
| 2002/0175126 A1 | 11/2002 | Naji et al. | |
| 2002/0179219 A1 | 12/2002 | Naji et al. | |
| 2002/0189499 A1 | 12/2002 | Naji et al. | |
| 2002/0189500 A1 | 12/2002 | Naji et al. | |

| | | | | | | |
|---|---|---|---|---|---|---|
| 2002/0192510 | A1 | 12/2002 | Naji et al. | JP | 61019900 | 1/1986 |
| 2003/0000424 | A1 | 1/2003 | Naji et al. | JP | 107849 / 88 | 5/1988 |
| 2003/0164119 | A1 | 9/2003 | Naji et al. | JP | 01141849 | 6/1989 |
| 2003/0213568 | A1 | 11/2003 | Wester et al. | JP | 55085756 | 6/1990 |
| 2003/0213569 | A1 | 11/2003 | Wester et al. | JP | 03016978 | 1/1991 |
| 2003/0213570 | A1 | 11/2003 | Vrbanac et al. | JP | 06144911 | 4/1992 |
| 2003/0213572 | A1 | 11/2003 | Vrbanac et al. | JP | 04182335 | 6/1992 |
| 2004/0043217 | A1 | 3/2004 | Dezutter et al. | JP | 06024821 | 6/1992 |
| 2004/0043686 | A1 | 3/2004 | Batdorf | JP | 04342746 | 11/1992 |
| 2004/0132843 | A1 | 7/2004 | Baumgart | JP | 5-177625 A2 | 7/1993 |
| 2004/0145078 | A1 | 7/2004 | Merkley et al. | JP | 05184246 | 7/1993 |
| 2004/0168615 | A1 | 9/2004 | Luo et al. | JP | 341093 / 94 | 12/1994 |
| 2005/0016423 | A1 | 1/2005 | Merkley et al. | JP | 07041592 | 2/1995 |
| 2005/0045067 | A1 | 3/2005 | Naji et al. | JP | 07109165 A | 4/1995 |
| 2005/0126430 | A1 | 6/2005 | Lightner et al. | JP | 08119708 | 5/1996 |
| 2005/0208287 | A1 | 9/2005 | Naji et al. | JP | 2508554 B2 | 6/1996 |
| 2005/0235883 | A1 | 10/2005 | Merkley et al. | JP | 10095922 | 4/1998 |
| 2007/0077436 | A1 | 4/2007 | Naji et al. | JP | 11-010631 | 1/1999 |
| | | | | JP | 11099512 | 4/1999 |

FOREIGN PATENT DOCUMENTS

| | | |
|---|---|---|
| JP | 2001 240458 | 9/2001 |
| AR | 014046 A1 | 3/2006 |
| JP | 2001316163 | 11/2001 |
| AR | 015457 A1 | 10/2006 |
| JP | 2003335560 | 11/2003 |
| AT | 391 131 B | 8/1990 |
| KR | 1019950008587 B1 | 8/1995 |
| AU | 515151 | 3/1981 |
| PL | 154782 | 12/1991 |
| AU | 2002240552 | 8/2007 |
| SU | 240472 | 3/1969 |
| CA | 1177205 * | 11/1984 |
| WO | WO 84/04765 | 12/1984 |
| CA | 2242749 | 2/1999 |
| WO | WO 91/01409 | 2/1991 |
| CA | 2405354 | 11/2001 |
| WO | WO 95/20066 | 7/1995 |
| CL | 32972 | 2/1980 |
| WO | WO 96/17996 | 6/1996 |
| CL | 2346-01 | 9/2001 |
| WO | WO 97/08111 * | 3/1997 |
| CL | 2347-01 | 9/2001 |
| WO | WO 97/31153 A1 | 8/1997 |
| CL | 2352-01 | 9/2001 |
| WO | WO 98/18855 | 5/1998 |
| CL | 2353-01 | 9/2001 |
| WO | WO 98/27027 | 6/1998 |
| CL | 461-02 | 3/2002 |
| WO | WO-9845222 | 10/1998 |
| CN | 1032332 A | 4/1989 |
| WO | WO 99/35330 * | 7/1999 |
| CN | 1199116 | 11/1998 |
| WO | WO 00/71336 A1 | 11/2000 |
| CN | 1224701 A | 8/1999 |
| WO | WO 01/30927 | 3/2001 |
| DE | 3037220 | 4/1982 |
| WO | WO 01/68547 | 9/2001 |
| DE | 3308917 | 9/1984 |
| WO | WO 01/81666 A2 | 11/2001 |
| DE | 3601736 A1 | 7/1987 |
| WO | WO 02/12623 A1 | 2/2002 |
| DE | 4316666 C1 | 12/1994 |
| WO | WO 02/18486 A2 | 3/2002 |
| DE | 19654836 | 6/1998 |
| WO | WO 02/28795 | 4/2002 |
| EP | 0049365 | 4/1982 |
| WO | WO 02/28796 A2 | 4/2002 |
| EP | 0056263 A1 | 7/1982 |
| WO | WO 02/33164 | 4/2002 |
| EP | 01474291 A1 | 7/1985 |
| WO | WO 02/33164 A2 | 4/2002 |
| EP | 0287962 | 4/1987 |
| WO | WO 02/070425 | 9/2002 |
| EP | 0305209 | 3/1989 |
| WO | WO 02/072499 A2 | 9/2002 |
| EP | 0331666 | 9/1989 |
| WO | WO 2004/063113 | 7/2004 |
| EP | 0263723 B1 | 2/1991 |
| EP | 484283 | 6/1992 |
| EP | 1088800 A | 4/2000 |
| EP | 1052262 | 11/2000 |
| EP | 1106236 A1 | 6/2001 |
| EP | 1155794 | 11/2001 |
| EP | 1346964 A2 | 9/2003 |
| EP | 1334076 B1 | 8/2006 |
| ES | 2033987 | 4/1993 |
| FR | 895184 | 1/1945 |
| FR | 1557348 | 2/1969 |
| FR | 2611432 | 9/1988 |
| GB | 22139 | 0/1901 |
| GB | 442098 | 2/1936 |
| GB | 449384 | 6/1936 |
| GB | 731597 | 6/1955 |
| GB | 1003850 | 8/1963 |
| GB | 1536663 | 12/1978 |
| GB | 2041384 | 9/1980 |
| GB | 1 604 910 | 12/1981 |
| GB | 1604910 | 12/1981 |
| GB | 2137977 | 10/1984 |
| GB | 2307425 A | 5/1997 |
| JP | 203747 / 84 | 11/1984 |

OTHER PUBLICATIONS

"Improvements in the Durability of Cellulose Reinforced Cementitious Composites," Lin et al. Mechanisms of Chemical Degradation of Cement based systems, Proceedings of the Materials Research Society's Symposium of Mechanisms, Boston, Nov. 27-30, 1995.

Neithalath, Narayanan, et al Acoustic Performance and Damping Behavior of Cellulose Cement Composites, Cement & Concrete Composites 25 (2003).

Mai et al., "Slow Crack Growth in Bleached Cellulose Fibre Cements" Journal of Mat'ls Science Letters 3 (1984), 127-130.

Thai MDF Board Co., Ltd "Beger Synotex Acrylic TM 100% Emulsion Paint" (2 pgs) 2003 article located at: http://www.thaimdf.com/paint_roofpaint.htm.

Mai et al., "Effects of Water and Bleaching on the Mechanical Properties of Cellulose Fiber Cements" Journal of Materials Science 18 (1983) 2156-62.

"Hardi-Plank and Surface Mold" article located at internet http://www.nefsi.org/wwwboard/messages/439.html (2 pgs).

Third Party Observation filed by Redco NV in the EPO application for .071VEP filed on Aug. 23, 2006.

FORCE 10 Caribbean "Custom Features" Engineered Building Systems (5 pgs) 1999.

Opposition to EP-B-1330571 filed by Redco on Dec. 15, 2006, but mailed by EP Patent Office on Dec. 28, 2006.

Opposition to EP-B-1330571 filed by St. Gobain Materiaux dated Jan. 19, 2007 but mailed by EP Pat.Office on Feb. 1, 2007.

Chemical Abstracts on STN "Plasticizing effect of aliphatic amines on cements" Babachev et al, Build Sci Inst. Sofia Bulgaria; Epitoanyag (1972), 24(11), 430-5; Abstract Only.

Hawley's Condensed Chemical Dictionary, Richard Lewis Sr., Twelfth Edition, 1993 Van Nostrand Reinhold, p. 435 definition of "dispersing agent."

A.D. Shapiro et al., Bumazhnaya Promyshiennost 36, 12 (1961) XP-002335287 "manufacture of board resistant to biological degradation".

Soroushian, Parviz "Development of Specialty Cellulose Fibers and Cementitious Matrices for Cellulose Fiber Reinforced Cement Composites".

JU8OCID "Special Anti-Mildew Coatings" Sep. 2002 (4 pgs).

XP002194276 (Abstract Bulletin) Ekman et al., "Studies on the Behavior of Extractives in Mechanical Pulp Suspensions" Nordic Pulp Paper Res. J.2, No. 5; 96-102 (Jun. 1990).

XP002197953 & JP 2001 240458 A, Kamishima Kagaku Kogyo KK) Database WPI, Section Ch, Week 200212, Derwent Publications Ltd., London, GB; AN 2002-085436, Sep. 4, 2001 abstract.

Finnish Forest Industries Federal "Mechanical Pulp Production" Internet article located at http://english.forestindustries.fi/products/pulp/mechanical.html dated Nov. 10, 2004 (2 pgs).

Ekman et al., "Studies on the Behavior of Extractives in Mechanical Pulp Suspensions," the Institute of Paper Science and Technology; Jun. 1990.

Technical File by Louisiana-Pacific Samao, Inc. sent to Redco on May 5, 1999.

Declaration by a Representative of the company (Bill Adams), Weyerhauser, and bills dated prior to Oct. 17, 1999.

M.D. Campbell and R.S.P. Coutts, Wood fibre-reinforced cement composites, in Journal of Materials Science, 15 (1980), pp. 1962-1970.

R.S.P. Coutts, "From forest to factory to fabrication," in Fibre Reinforced Cement and Concrete, 1992, ed. R.N. Swamy, E & FN SPON, London, pp. 31 to 47.

Extract from Webster's Third New International Dictionary of the English Language unabridged, ed Merriam-Webster Inc., Springfield, 1986.

Woods, Amy Lamb "Keeping a Lid on It: Asbestos-Cement Building materials" Aug. 2000 (12 pgs) internet article located at: www.cr.nps.gov/hps/tps/recentpast/asbestosarticle.htm.

Chapter 5 "Asbestos Cement Products" pp. 25-40 (book unknown).

U.S. Appl. No. 10/070,218, unpublished, Goodwin.

Chemical Abstracts, vol. 94, No. 8, Feb. 23, 1981; Columbus, Ohio, U.S.; Abstract No. 51915a; "Building Materials with Improved Black Mold Resistance".

Chemical Abstracts, vol. 104, No. 14, Apr. 7, 1986; Columbus, Ohio, U.S.; Abstract No. 114971p; "Lightweight Cement Moldings".

Expert Declaration of Prof. Dr. Dahl, with CV (Jan. 28, 2009).

Expert Declaration of Prof. Dr. Roffael (Jan. 28, 2009).

MacDougall, F.H., Excerpt "Reactions in Heterogeneous Systems" Thermodynamics and Chemistry (1921), title page and p. 64.

Elastomeric Wall Coatings website article located at http://www.energy-seal.com/es-home.nsf/products/everlast (undated), 2 pgs.

Written Opinion for WO 02/028796 A2.

Final office action mailed Jan. 16, 2008 in U.S. Appl. No. 10/753,089 (2004/0168615).

Response to final office action filed Oct. 31, 2007 in relation to U.S. Appl. No. 10/753,089 (2004/0168615).

Information Disclosure Statement filed Sep. 28, 2007 and Oct. 29, 2007 and initialed by Examiner in U.S. Appl. No. 10/753,089 (2004/0168615).

"Forming Handsheets For Physical Tests of Pulp," TAPPI, T 205 sp-95, 1995 pp. 5-7.

"Moisture In Pulp, Paper and Paperboard," TAPPI, T 412 om-94, pp. 1-3, 1994.

Harper, S., and M. Grenggs, "Resin Extraction and Effects on Pulp Quality," Proceedings of the 54th Appita Annual Conference, Melbourne, Apr. 3-6, 2000, pp. 575-580.

Stromberg, C.B., "Washing For Low Bleach Chemical Consumption," in Thomas W. Joyce (ed.), Environmental Issues: A TAPPI Press Anthology of Published Papers, TAPPI Press, Atlanta, 1990 pp. 230-238.

Stromberg, C.B., Washing Of Dissolved Organic Solids From Pulp, Paper Asia, Oct. 1994, pp. 32-39.

Scandinavian Pulp, Paper and Board Testing Committee, "COD and TOC Removable by Washing," SCAN-C 45:00, 2000, pp. 1-5.

Scandinavian Pulp, Paper and Board Testing Committee, "Water-Soluble Organic Matter," SCAN-CM 45:91, 1991, pp. 1-4.

The Trial of Antisepsis and Mothproof on Rural Timber Structure Architectures, Ming Zhou, China Wood Industry, Issue 2 of 1987, pp. 16-24.

International Search Report for PCT/US05/007581, Aug. 3, 2005.

International Preliminary Report on Patentability for PCT/US2005/007581 dated Jun. 19, 2007.

Letter to European Patent Office from Opponent REDCO dated Aug. 1, 2008 (14 pgs., including translation).

Documents from the Examination Procedure of European Patent Application No. 05075809.3, submitted to European Patent Office on Aug. 1, 2008 by Opponent REDCO.

"Pre-extraction of hemicelluloses and subseuqent kraft pulping Part I: alkaline extraction" article from TAPPI Journal (Jun. 2008) (6 pgs).

Letter to European Patent Office from Opponent Saint Gobain dated Aug. 1, 2008 (3 pgs., including translation).

International Search Report for PCT/AU03/01315 dated Nov. 12, 2003 (1882369).

Blankenhorn et al., "Temperature and Moisture Effects on Selected Properties of Wood Fiber-Cement Composites" Cement and Concrete Research 29 (1999) pp. 737-741.

Third Party Observation by Redco NV in EP Application No. 01975765.7 filed Jul. 2, 2010.

Third Party Observation by Redco NV in EP Application No. 01973377.3 filed Jun. 25, 2010.

EPO Rule 73 Communication in EP 01973377.3 mailed Jul. 7, 2010.

\* cited by examiner

FIG. 3    SEVERAL EMBODIMENTS OF FIBER TREATMENT/SIZING PROCESS BY DRY SPRAY

FIBER CEMENT COMPOSITE MATERIALS USING SIZED CELLULOSE FIBERS

RELATED APPLICATIONS

This application is a divisional application of U.S. application Ser. No. 09/969,742 filed Oct. 2, 2001, now U.S. Pat. No. 6,676,745, entitled "Fiber Cement Composite Materials Using Sized Cellulose Fibers." This application also claims benefit of U.S. Provisional Application No. 60/237,850, filed on Oct. 4, 2000, U.S. Provisional Application No. 60/237,783, filed on Oct. 4, 2000, and U.S. Provisional Application No. 60/241,212, filed on Oct. 17, 2000, the entirety of each of which is hereby incorporated by reference.

BACKGROUND OF THE INVENTION

1. Field of the Invention

This invention relates to the chemical treatment of cellulose fibers to impart the fiber with higher hydrophobicity and/or durability. More particularly, this invention relates to cellulose fiber reinforced cement composite materials using sized cellulose fibers, including fiber treatment methods, formulations, methods of manufacture and final products with improved material properties relating to the same.

2. Description of the Related Art

Ordinary Portland cement is the basis for many products used in building and construction, primarily concrete and steel reinforced concrete. Cement has the enormous advantage that it is a hydraulically settable binder, and after setting it is little affected by water, compared to gypsum, wood, wood particle boards, fiberboard, and other common materials used in building products. This is not to say that water has no effect on cement. Some dissolution of chemical components does occur when cement is saturated with fresh water, and these can be transported and re-deposited in different places if the cement is once again dried.

Asbestos Fiber Cement Technology

About 120 years ago, Ludwig Hatschek made the first asbestos reinforced cement products, using a paper-making sieve cylinder machine on which a very dilute slurry of asbestos fibers (up to about 10% by weight of solids) and ordinary Portland cement (about 90% or more) was dewatered, in films of about 0.3 mm, which were then wound up to a desired thickness (typically 6 mm) on a roll, and the resultant cylindrical sheet was cut and flattened to form a flat laminated sheet, which was cut into rectangular pieces of the desired size. These products were then air-cured in the normal cement curing method for about 28 days. The original use was as an artificial roofing slate.

For over 100 years, this form of fiber cement found extensive use for roofing products (slates, and later corrugated sheets), pipe products, and walling products, both external siding (planks and panels), and wet-area lining boards. Asbestos cement was also used in many applications requiring high fire resistance due to the great thermal stability of asbestos. The great advantage of all these products was that they were relative lightweight and that water affected them relatively little, since the high-density asbestos/cement composite is of low porosity and permeability. The disadvantage of these products was that they were brittle and the high-density matrix did not allow nailing, and methods of fixing involved pre-drilled holes.

Although the original Hatschek process (a modified sieve cylinder paper making machine) dominated the bulk of asbestos cement products made, other processes were also used to make specialty products, such as thick sheets (say greater than 10 mm). These processes used the same mixture of asbestos fibers and cement as the Hatschek process. Sometimes process aids are needed in other fabrication processes, for example, extrusion, injection molding, and filter press or flow-on machines.

Two developments occurred around the middle of the last century that have high significance to modern replacements of asbestos based cement composites. The first was that some manufacturers realized that the curing cycle could be considerably reduced, and cost could be lowered, by autoclaving the products. This allowed the replacement of a portion of the cement with fine ground silica, which reacted at autoclave temperatures with the excess lime in the cement to produce calcium silica hydrates similar to the normal cement matrix. Since silica, even when ground, is much cheaper than cement, and since the autoclave curing time is much less than the air cured curing time, this became a common, but by no means universal manufacturing method. A typical formulation would be about 5-10% asbestos fibers, about 30-50% cement, and about 40-60% silica.

The second development was to replace some of the asbestos reinforcing fibers by cellulose fibers from wood or other raw materials. This was not widely adopted except for siding products and wet-area lining sheets. The great advantage of this development was that cellulose fibers are hollow and soft, and the resultant products could be nailed rather than by fixing through pre-drilled holes. The siding and lining products are used on vertical walls, which is a far less demanding environment than roofing. However, cellulose reinforced cement products are more susceptible to water induced damages, compared to asbestos cement products. A typical formulation would be about 3-4% cellulose, about 4-6% asbestos, and either about 90% cement for air cured products, or about 30-50% cement, and about 40-60% silica for autoclaved products.

Asbestos fibers had several advantages. The sieve cylinder machines require fibers that form a network to catch the solid cement (or silica) particles, which are much too small to catch on the sieve itself. Asbestos, although it is an inorganic fiber, can be "refined" into many small tendrils running off a main fiber. Asbestos fibers are strong and stiff, and bond very strongly with the cement matrix. They are stable at high temperatures. They are stable against alkali attack under autoclave conditions. Hence, asbestos reinforced fiber cement products are themselves strong, stiff (also brittle), and could be used in many hostile environments, except highly acidic environments where the cement itself is under chemical attack. The wet/dry cycling that asbestos roofing products were subjected to, often caused a few problems, primarily efflorescence (efflorescence is caused by the dissolution of chemicals inside the products when wet, followed by the deposition of these chemicals on the surfaces of the products when dried). Efflorescence caused aesthetic degradation of roofing products in particular, and many attempts were made to reduce it. Because the matrix of asbestos reinforced roofing products was generally very dense (specific gravity about 1.7), the total amount of water entering the product even when saturated was relatively low, and the products generally had reasonable freeze thaw resistance. If the density was lowered, the products became more workable (for example they could be nailed) but the rate of saturation and the total water absorption increased and the freeze thaw performance decreased.

Alternative Fiber Cement Technologies

In the early 1980's, the health hazards associated with mining, or being exposed to and inhaling, asbestos fibers started to become a major health concern. Manufacturers of asbestos cement products in the USA, some of Western Europe, and Australia/New Zealand in particular, sought to find a substitute for asbestos fibers for the reinforcement of building and construction products, made on their installed manufacturing base, primarily Hatschek machines. Over a period of twenty years, two viable alternative technologies have emerged, although neither of these has been successful in the full range of asbestos applications.

In Western Europe, the most successful replacement for asbestos has been a combination of PVA fibers (about 2%) and cellulose fibers (about 5%) with primarily about 80% cement. Sometimes 10-30% of inert fillers such as silica or limestone are in the formulation. This product is air-cured, since PVA fibers are, in general, not autoclave stable. It is generally made on a Hatschek machine, followed by a pressing step using a hydraulic press. This compresses the cellulose fibers, and reduces the porosity of the matrix. Since PVA fibers can't be refined while cellulose can be, in this Western European technology the cellulose fiber functions as a process aid to form the network on the sieve that catches the solid particles in the dewatering step. This product is used primarily for roofing (slates and corrugates). It is usually (but not always) covered with thick organic coatings. The great disadvantage of these products is a very large increase in material and manufacturing process costs. While cellulose is currently a little more than asbestos fibers of $500 a ton, PVA is about $4000 a ton. Thick organic coatings are also expensive, and hydraulic presses are a high cost manufacture step.

In Australia/New Zealand and the USA, the most successful replacement for asbestos has been unbleached cellulose fibers, with about 35% cement, and about 55% fine ground silica, such as described in Australian Patent No. 515151 and U.S. Pat. No. 6,030,447, the entirety of which is hereby incorporated by reference. This product is autoclave cured, as cellulose is fairly stable in autoclaving. It is generally made on a Hatschek machine, and it is not usually pressed. The products are generally for siding (panels and planks), and vertical or horizontal tile backer wet area linings, and as eaves and soffits in-fill panels. The great advantage of these products is that they are very workable, even compared to the asbestos based products, and they are low cost.

However, cellulose fiber cement materials can have performance drawbacks such as lower resistance to water induced damages, higher water permeability, higher water migration ability (also known as wicking) and lower freeze thaw resistance when compared to asbestos cement composite material. These drawbacks are largely due to the presence of water conducting channels and voids in the cellulose fiber lumens and cell walls. The pore spaces in the cellulose fibers can become filled with water when the material is submerged or exposed to rain/condensation for an extended period of time. The porosity of cellulose fibers facilitates water transportation throughout the composite materials and can affect the long-term durability and performance of the material in certain environments. As such, conventional cellulose fibers can cause the material to have a higher saturated mass, poor wet to dry dimensional stability, lower saturated strength, and decreased resistance to water damage.

The high water permeability of the cellulose reinforced cement materials also results in potentially far greater transport of some soluble components within the product. These components can then re-deposit on drying, either externally, causing efflorescence, or internally, in capillary pores of the matrix or fiber. Because the materials are easier to saturate with water, the products also are far more susceptible to freeze/thaw damage. However, for vertical products, or eaves and soffit linings, and for internal linings, none of these water-induced disadvantages are very relevant.

To summarize, the replacement of asbestos in Europe has been largely by air cured fiber cement products, using PVA fibers, and pressed after forming in the green state. The primary problem with this technology is increased material and manufacturing cost. The replacement of asbestos in USA and Australia/New Zealand has been largely by autoclaved fiber cement products, using cellulose fibers, and formed with lower density without pressing. The primary problem with this technology is increased rate, and quantity, of water absorption into the product when wet, and reduced resistance to freeze thaw cycles.

Certain prior art references teach using fibers that are grafted with a silane or silylating coupling agent. However, these references are directed to improving the bonding between the fibers and the cement so as to increase the strength of the composite material. As such, the coupling agents selected contain primarily hydrophilic functional groups with the specific purpose of bonding with both the hydroxyl groups on the fiber surface and the cementitious matrix. In fact, these references teach away from using coupling agents having hydrophobic functional groups as the hydrophobic groups would slightly decrease, rather than increase, the material strength.

For example, U.S. Pat. No. 5,021,093 teaches grafting a silyating agent to the fiber surface so as to improve the strength of the resulting composite material. The silyating agent comprises molecules containing hydrophilic groups on both ends so that one end can bond with hydroxyl groups on the fiber surface and the other end can bond with the cementitious matrix. The silyating agent essentially serves as a coupling agent that connects hydroxyl groups on the fiber surface to the cementitious matrix.

U.S. Pat. No. 4,647,505 teaches applying a chelating agent to a cellulose fiber to reduce fiber swelling in aqueous and alkaline solutions. The fibers are impregnated with a solution of a titanium and/or zirconium chelate compound. The chelate compound, however, does not react upon contact with the fiber, because the fiber is contained in an aqueous medium, and the chelate compounds described in the patent resist hydrolysis at ambient temperatures. Therefore, this patent describes heating the fibers above 100° C. to dry the fibers, thereby allowing the reaction to take place. After drying, the chelate compound(s) react with hydroxyl groups on the cellulose fibers to produce cross-linking between the hydroxyl group residues.

As U.S. Pat. No. 4,647,505 is directed primarily to reducing swelling of cellulose fibers, it is not specifically directed to increasing hydrophobicity of the fibers. Moreover, this patent provides an approach to fiber treatment which requires drying of the fibers in order to induce reaction with the cellulose fibers.

Accordingly, what is needed is an efficient method for preventing damage and degradation to a fiber cement building material, particularly due to water and/or other environmental effects. What is also needed are material formulations and products having improved resistance to water and/or environmental degradation.

SUMMARY OF THE INVENTION

The preferred embodiments disclose a new technology: chemically treating cellulose fibers to impart the fibers with hydrophobicity and/or durability, and making cellulose fiber reinforced cement composite materials using these chemically treated cellulose fibers. In one preferred embodiment, the cellulose fibers are treated or sized with specialty chemicals that impart the fibers with higher hydrophobicity by partially or completely blocking the hydrophilic groups of the fibers. However, other embodiments for chemically treating the fibers are also disclosed, including loading or filling the void spaces of the fibers with insoluble substances, or treating the fibers with a biocide to prevent microorganism growth or treating the fibers to remove the impurities, etc.

More preferably, in a sized fiber embodiment, several aspects are disclosed, including fiber treatment, formulations, methods of making the composite materials, and final materials and properties. This technology advantageously provides fiber cement building materials with the desirable characteristics of reduced water absorption, reduced rate of water absorption, lower water migration, and lower water permeability. Final products made from these materials have improved freeze-thaw resistance, reduced efflorescence, reduced dissolution and re-deposition of water-soluble matrix components in natural weathering. It is possible, with the right fiber sizing, to improve other product properties, for example, rot and UV resistances, compared to conventional fiber cement products. It has been found, surprisingly, that these improved attributes in water resistance are gained without significant loss in dimensional stability, strain or toughness. Additionally, the use of sized fibers can result in improved physical and mechanical properties of the final product.

More particularly, the preferred embodiments show that by blocking the hydrophilic sites on the inner and outer surfaces of cellulose fibers with sizing agents, an engineered cellulose fiber can be produced that, when used in fiber cement, still has the advantages of regular cellulose of refining, autoclaving, and manufacture without pressing, but the resultant fiber cement material also approaches or exceeds the performance advantages of artificial fibers such as PVA, in terms of the rate and amount of water absorption when used in fiber reinforced cement composite materials. In addition, smaller quantities of fibers may be used, so that the cost of treating the fiber can be offset by the lower usage of the fiber in products, without a significant reduction in the important physical properties of the material, such as strength and toughness.

In particular, the preferred embodiments show that when used in formulations typical of autoclaved cellulose based fiber cement, the rate of water absorption and the amount of water absorption are greatly reduced in the composite product. The tendency to effloresce, or to dissolve and re-deposit chemicals internally and externally to the product, or to suffer freeze/thaw damage, etc., is reduced.

Also, the treated fibers may still be refined to act as a catch medium in the Hatschek process, they may still be autoclaved without excessive fiber degradation, and they make products adequate in strength without pressing. Furthermore, with lower amounts of actual cellulose fiber being used, the preferred embodiments experience no reduction in key physical properties such as strength, stiffness, and moisture movement, and may, in fact, improve some of these properties.

Thus, the use of engineered sized fibers imparts to the composite material these enhanced properties, and therefore constitute an alternative technology that, when fully implemented, has the potential to improve mechanical properties and the workability with the material in building and construction, while improving the durability of the products in various environments including especially those that involve cyclic wetting and drying, freezing and thawing, and exposure to UV and the atmosphere, regardless of the means of manufacture. They are particularly suitable to the Hatschek process that requires a refineable fiber (to catch solid particles) and to the autoclave curing cycle that allows the replacement of cement with fine ground silica, although they may also be of use in the air cured products, in conjunction with PVA, to reduce the necessity of the expensive process pressing.

Accordingly, preferred embodiments of the present invention will solve many of the problems that are associated with regular cellulose fiber reinforced cement composite materials, such as high water permeability, high water absorption, efflorescence, internal water dissolution and re-deposition of materials, and low durability in freeze/thaw weathering environments in comparison with asbestos cement materials, while maintaining or improving some of key mechanical and physical properties. Surprisingly, less cellulose fiber may be required. Moreover, this technology is also beneficial for solving one of the key problems of air cured, PVA reinforced fiber cement, by eliminating the need for the expensive process of hydraulic pressing of the formed "green" body, to crush the cellulose fibers and reduce water permeability in finished products.

In one aspect of the present invention, a composite building material is provided comprising a cementitious matrix and cellulose fibers incorporated into the cementitious matrix. At least some of the cellulose fibers have surfaces that are at least partially treated with a sizing agent so as to make the surfaces hydrophobic. The sizing agent comprises a hydrophilic functional group and a hydrophobic functional group, wherein the hydrophilic group permanently or temporarily bonds to hydroxyl groups on the fiber surface in the presence of water or an organic solvent in a manner so as to substantially prevent the hydroxyl groups from bonding with water molecules. The hydrophobic group is positioned on the fiber surface and repels water therefrom.

One preferred formulation of a building material made in accordance with this new technology comprises a cementitious binder, preferably Portland cement; an aggregate, preferably silica which may be fine ground if it is to be autoclaved; one or more density modifiers; cellulose fibers, at least some of the cellulose fibers having surfaces that are at least partially treated with a sizing agent so as to make the surfaces hydrophobic; and one or more additives. The sizing agent comprises a hydrophilic functional group and a hydrophobic functional group, wherein the hydrophilic group permanently or temporarily bonds to hydroxyl groups on the fiber surface in the presence of water or an organic solvent in a manner so as to substantially prevent the hydroxyl groups from bonding with water molecules. The hydrophobic group is positioned on the fiber surface and repels water therefrom.

The hydrophilic sites, for example the hydroxyl functional groups, on these fibers are partially or completely blocked with sizing agents to reduce the affinity to water. The sizing agents may comprise organic compounds, inorganic compounds, or combinations thereof. In one embodiment, the sizing agent comprises both hydrophilic and hydrophobic functional groups. Preferably, the hydrophilic groups on the sizing agent bond with the hydroxyl groups on the fiber surface and thus prevent the hydroxyl groups from bonding with water, while the hydrophobic groups on the sizing agent are positioned on the fiber surface to repel water. The sizing agents can comprise about 50% of the dry weight of the cellulose fibers. Most preferably, sizing agents in the sized fibers are approximately 0.01 to 10% of the cellulose fiber weight.

A method of manufacturing a fiber reinforced composite building material using the formulations described constitutes another aspect of the present invention. One preferred method comprises providing cellulose fibers and treating at least a portion of the cellulose fibers with a sizing agent in the presence of water or an organic solvent. The sizing agent comprises a hydrophilic functional group and a hydrophobic functional group. The hydrophilic group chemically bonds to at least some of the hydrophilic sites on inner and outer surfaces of the fibers to form sized fibers. The sizing agent substantially blocks the hydrophilic sites, thereby reducing the fibers' affinity toward water. The sized fibers are mixed with a cementitious binder and other ingredients to form a fiber cement mixture. The fiber cement mixture is formed into a fiber cement article of a pre-selected shape and size. The fiber cement article is cured so as to form the fiber reinforced composite building material.

Some of the above steps can be omitted or additional steps may be used, depending on the particular application. The step of sizing the fibers preferably comprises treating the fibers with inorganic compounds, organic compounds, or combinations thereof using techniques involving dry spraying or solution treatments, although other methods of applying sizing agents are feasible, such as coating, painting and impregnation. Each of these techniques preferably occurs in the presence of water or an organic solvent. Preferably, the step of mixing the sized fibers with ingredients to form a fiber cement mixture comprises mixing the sized fibers with non-cellulose materials such as a cementitious binder, aggregate, density modifiers, and additives in accordance with preferred formulations described herein. In another embodiment, the sized fibers can also be mixed with conventional untreated cellulose fibers and/or natural inorganic fibers, and/or synthetic fibers along with the other ingredients. The fabrication processes can be any of the existing technologies, such as Hatschek processing, extrusion, and molding.

A fiber reinforced cement composite material made using the formulations and the processes disclosed has a fiber cement matrix where the sized cellulose fibers are incorporated into the matrix. The hydrophilic sites on the surfaces of these sized fibers are partially or completely blocked with sizing agents to reduce the affinity for water. Some residual sizing agents from the treated fibers may also react with the inorganic and organic components of fiber cement matrix, blocking hydrophilic sites inside and outside of the matrix. As a result, the final product will be more hydrophobic.

Application of the sized fibers reduces the water migration by more than about 9 times within a 8 hour test, more than about 15 times within a 24 hour test and about 25 times after a 96 hour test, as compared to an equivalent formulation made without sized fibers. In one embodiment the sized fibers lower the rate of water absorption of the building product by more than about 5% in the first 8 hours of water soaking test, and reduces the net water absorption by about 10% or more after 24 hours of water soaking test. The water permeability rate is reduced by about 20% or more. Moreover, the sized fibers also reduce the efflorescence, a side effect of the water permeation. Use of the fibers treated with specialty chemicals may improve the UV, rot, and freeze-thaw resistances of the final building product.

Preferred embodiments of the present invention are not limited to sized fibers. Accordingly, in another aspect of the present invention, a building material incorporating individualized reinforcing fibers is provided. At least a portion of the fibers are chemically treated in the presence of water or an organic solvent to improve the building material's resistance to water and/or environmental degradation.

In another aspect, a building material formulation is provided comprising a hydraulic binder and individualized reinforcing fibers. At least a portion of the fibers is chemically treated in the presence of water or an organic solvent to improve the building material's resistance to water and/or environmental degradation.

In another aspect, a method of manufacturing a building material incorporating reinforcing fibers is provided. At least a portion of the reinforcing fibers are chemically treated in the presence of water or an organic solvent to improve the fiber's resistance to water and/or environmental degradation. The reinforcing fibers are preferably individualized. The reinforcing fibers are mixed with a hydraulic binder to form a mixture. The mixture is formed into an article of a pre-selected shape and size. The article is cured so as to form the fiber reinforced building material.

Advantageously, the preferred embodiments of the present invention provide fiber reinforced building materials that have reduced water migration, lower water absorption rate, lower water permeability, less efflorescence, less severe dissolution and re-deposition problems, and improved freeze-thaw resistance, as compared with a building material made from an equivalent formulation without sized cellulose fibers. Furthermore, the preferred building materials are dimensionally stable and retain the advantages of cellulose fiber reinforced materials. The building material with sized fibers can be manufactured using conventional processes for fiber cement materials. Less cellulose fibers may be required in making the composite materials. These and other advantages will become more fully apparent from the following description taken in conjunction with the accompanying drawings.

DETAILED DESCRIPTION OF THE PREFERRED EMBODIMENTS

Figure 1:
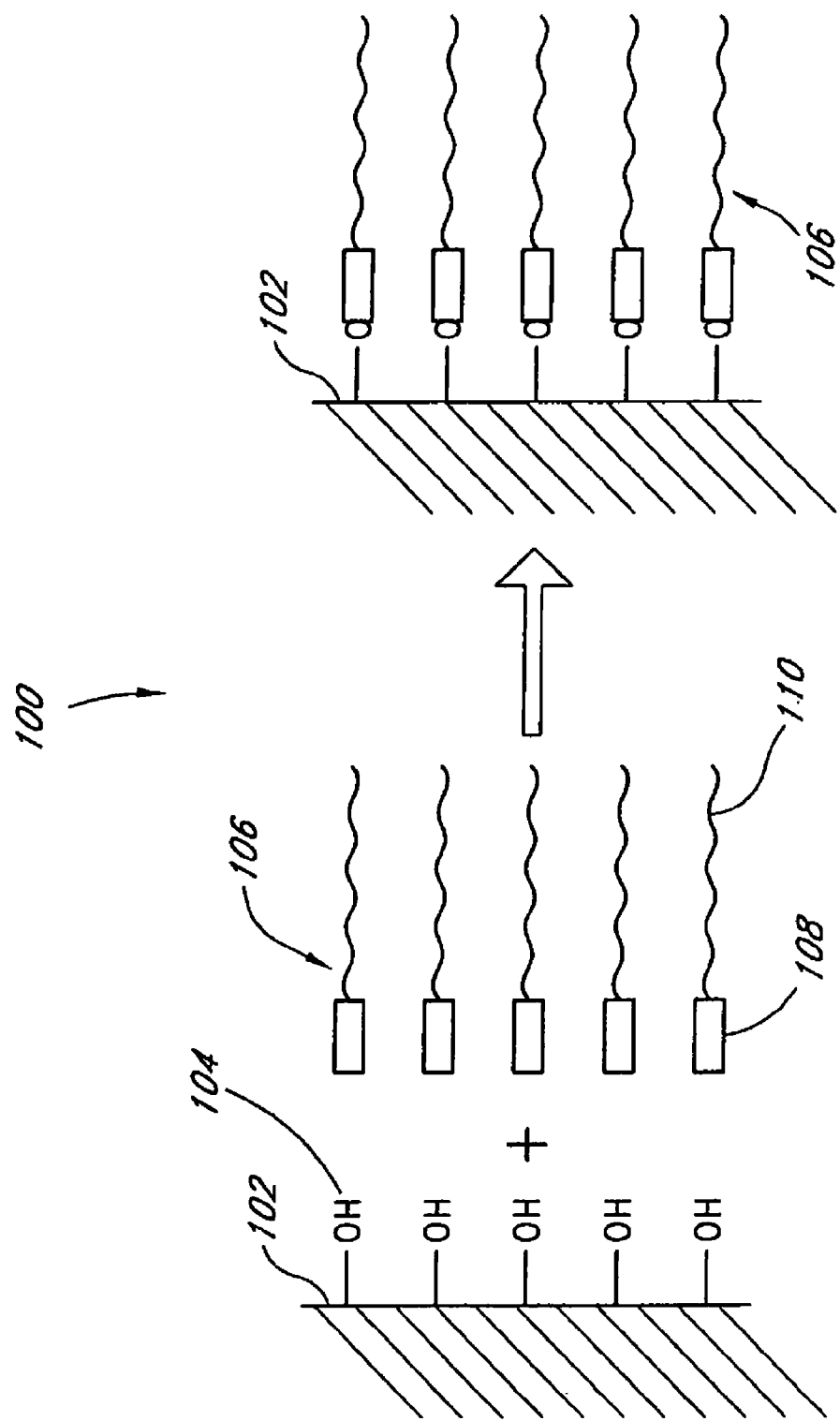
FIG. 1 is a schematic illustration of an exemplary cellulose fiber having its inner and outer surfaces treated with a sizing agent in accordance with one preferred embodiment.

The preferred embodiments of the present invention relates generally to the chemical treatment of cellulose fibers in order to improve their resistance to water and/or environmental degradation for use in a composite building material. These embodiments include not only the use of sized cellulose fibers, as described in further detail below, but also other chemical treatments, such as the loading of fibers with insoluble substances to fill the void spaces of the fibers, and biocide treatment of fibers. Other chemical treatments to improve a building material's final properties are also contemplated as being within the scope of this invention. For example, chemical treatments to lower COD content in a fiber are described in Applicant's co-pending application entitled METHOD AND APPARATUS FOR REDUCING IMPURITIES IN CELLULOSE FIBERS FOR MANUFACTURE OF FIBER REINFORCED CEMENT COMPOSITE MATERIALS, Ser. No. 09/970,389 filed, Oct. 2, 2001, the entirety of which is hereby incorporated by reference. It will be appreciated that the aspects of the present invention are not applicable solely to cellulose fiber reinforced cementitious products, and accordingly, the chemical treatments may be applied to building materials reinforced with other fibers in non-cement products as well. The main treatments, in addition to the later described sized fiber treatment, fall into two additional groups, which will now be described in more detail. These are loaded fibers and biocide treated fibers:

Loaded Fibers

In one preferred embodiment, this invention relates to the application of loaded, individualized cellulose fibers into cementitious cellulose fiber reinforced building materials. The loaded cellulose fibers generally comprise individualized cellulose fibers filled with one or more insoluble chemical compounds. Organic and/or inorganic compounds are preferably incorporated in the water conducting channels and voids present in the cellulose fiber lumens and cell walls. The loading methods may include chemical treatments such as chemical reactions, physical deposition or a combination of both. Advantageously, the substances that are deposited inside the fibers inhibit the transfer of water along the water conducting channels and voids, which in turn inhibits water migration in the fiber cement composite material. The loaded fibers preferably have non-cellulose contents from about 0.5%-200% based on the oven dry weight of cellulose fibers. More preferably, the loaded fibers contain up to about 80% by weight of non-cellulose substances. The lumens in the fibers can be loaded using methods described in U.S. Pat. Nos. 4,510,020 and 5,096,539, the entirety of both of which are hereby incorporated by reference. Other loading methods may be used.

The chemical compounds selected for fiber loading preferably do not interfere with cement hydration reactions or contaminate the process water. Moreover, the chemical compounds preferably provide some beneficial attributes to the fiber cement product such as those that provide better fire resistance or biological resistance. The loading substances preferably have the same or similar thermal and moisture expansion coefficients as that of the cementitious matrix. Chemical compounds that can be used include, but are not limited to, inorganic salts of sodium, potassium, calcium, zinc, copper, aluminum, and barium such as carbonate, silicate, chromate, aluminate, acetate, palmitate, oleate, stearate, sulfate, phosphate, or borate in all forms; clay of all kinds; cement of all types; calcium silicate hydrate of all kinds; and kaolin of all kinds, or mixtures thereof. Furthermore, organic compounds that can also be used include but are not limited to natural or petroleum waxes, polyolefins, acrylics, epoxies, urethane, and styrene butadiene rubber, plastics of all kinds, and other resins.

The loading of the fibers preferably causes the insoluble substances to occupy the pore spaces within the fiber voids and cell walls. More preferably, loading of the pore spaces takes place without causing the formation of precipitates on the surface of the fibers. Doing so will avoid altering the fiber surface characteristics. The loading compounds preferably have a particle size in the range of about 0.01 to 20 μm in diameter.

It will be appreciated that the above list of chemical compounds is merely illustrative of examples of substances that can be used for fiber loading. The loading substance can also be other suitable inorganic or organic compounds, or combinations thereof, depending on the particular attributes needed for the specific application of the fiber cement material. In one embodiment, calcium carbonate is loaded into the cellulose fibers using known methods of fiber loading such as those described in U.S. Pat. Nos. 5,223,090 and RE35,460, the entirety of both of which are hereby incorporated by reference.

One preferred formulation of the fiber reinforced composite material comprises a cementitious binder, an aggregate, loaded cellulose fibers, density modifiers, and various additives to improve different material properties. It will be appreciated that not all of these components are necessary to formulate a suitable building product, and thus, in certain embodiments, the formulation may simply comprise cementitious binder and loaded cellulose fibers.

The cementitious binder is preferably Portland cement but can also be, but is not limited to, high alumina cement, lime, high phosphate cement, and ground granulated blast furnace slag cement, or mixtures thereof. The aggregate is preferably ground silica sand but can also be, but is not limited to, amorphous silica, micro-silica, diatomaceous earth, coal combustion fly and bottom ash, rice hull ash, blast furnace slag, granulated slag, steel slag, mineral oxides, mineral hydroxides, clays, magnasite or dolomite, metal oxides and hydroxides, and polymeric beads, or mixtures thereof.

The density modifiers can be organic and/or inorganic lightweight materials with a density less than 1.5 g/cm$^3$. The density modifiers may include plastic materials, glass and ceramic materials, calcium silicate hydrates, microspheres, and volcanic ashes, including perlite, pumice, shirasu basalt, and zeolites in expanded forms. The density modifiers can be natural or synthetic materials.

The additives can include, but are not limited to, viscosity modifiers, fire retardants, waterproofing agents, silica fume, geothermal silica, thickeners, pigments, colorants, plasticizers, dispersants, forming agents, flocculents, drainage aids, wet and dry strength aids, silicone materials, aluminum powder, clay, kaolin, alumina trihydrate, mica, metakaolin, calcium carbonate, wollastonite, and polymeric resin emulsion, and mixtures of thereof or other materials.

The cellulose fibers are unrefined/unfibrillated or refined/fibrillated cellulose pulps from various sources, including but not limited to bleached, unbleached, semi-bleached cellulose pulp. The cellulose pulps can be made of softwood, hardwood, agricultural raw materials, recycled waste paper or any other forms of lignocellulosic materials. Cellulose fibers can be made by various pulping methods. In the pulping process wood or other lignocellulosic raw materials such as kenaf, straw, and bamboo, etc., are reduced to a fibrous mass by the means of rupturing the bonds within the structures of lignocellulosic materials. This task can be accomplished chemically, mechanically, thermally, biologically, or by combinations of these treatments.

The cellulose fibers used for reinforcing cement composite materials are predominantly individualized fibers with partial or complete removals of lignin components from the fiber cell walls. In one embodiment, at least 90% of the lignin components are removed from the fiber cell walls. These fibers are preferably prepared by chemical pulping methods, which rely mainly on the effects of chemicals to separate fibers. Based on the chemicals utilized in the process, the chemical pulping methods are classified as Soda, Kraft, Kraft-AQ, Soda-AQ, Oxygen Delignification, Kraft-Oxygen, Organic Solvent methods, and Sulfite pumping, steam explosion pulping or any other pulping techniques. In the chemical pulping method, lignin, which acts as glue holding cellulose and hemicellulose together to provide mechanical strength in the wood, is broken and dissolved by chemical reactions.

These chemical reactions are usually carried out in a reactor, often called a digester, under a high temperature around 150 to 250° C. for about 30 minutes to 2 hours. The cleavage of the bonds between lignin and cellulosic components results in weakening of the bonds among fibers. With aids of mild mechanical forces, cellulose fibers are then separated into individual fibers.

Loaded cellulose fibers can be used in a variety of composite materials all having different proportions of cementitious binder, aggregates, loaded and/or unloaded cellulose fibers, additives and density modifiers to obtain optimal properties for a particular application. In one embodiment, the composite formulation contains up to about 50% loaded fibers by weight, more preferably about 0.5% to 20%. Furthermore, the loaded fibers may be blended with conventional unloaded cellulose fibers and/or synthetic polymer fibers in different proportions. It will be appreciated that the percentage of loaded cellulose fibers may be varied depending on the desired application and/or process. Furthermore, the proportion of the cementitious binder, aggregate, density modifiers, and additives can also be varied to obtain optimal properties for different applications, such as roofing, deck, paving, pipes, siding, fencing, trim, soffits, or backer for tile underlayment.

Most of the loaded fiber embodiments described herein can be encompassed by the following formulation:
- about 10%-80% cementitious binder;
- about 20%-80% silica (aggregates);
- about 0%-50% density modifiers;
- about 0%-10% additives; and
- about 0.5%-20% loaded cellulose fibers or a combination of loaded cellulose fibers, and/or regular unloaded fibers, and/or natural inorganic fibers, and/or synthetic fibers.

It will be appreciated that for fiber cement articles that are to be air-cured, higher amounts of cement may be used, for example 60%-90%, without incorporating any silica or aggregate. In autoclaved embodiments, a lower amount of cement can be used incorporating individualized, loaded cellulose fibers. In one embodiment, this autoclaved formulation comprises:
- about 20%-50% cement, more preferably about 25%-45%, even more preferably about 35%;
- about 30%-70% fine ground silica, more preferably about 60%;
- about 0-50% density modifiers;
- about 0-10% additives, more preferably about 5%; and
- about 2%-20% fibers, more preferably about 10% fibers, wherein some fraction of the fibers is cellulose fibers loaded with inorganic and/or organic materials that reduce water flow in the fiber pore space;

Preferably, the loaded fibers have a freeness of 150 to 750 degrees of Canadian Standard Freeness (CSF) in accordance with TAPPI method T 227 om-99. The cementitious binder and aggregate have surface areas of about 250 to 400 $m^2/kg$ and about 300 to 450 $m^2/kg$, respectively. The surface area for both the cement and silica is tested in accordance with ASTM C204-96a.

The water conducting channels and voids in the cellulose fibers lumens and cell walls are preferably filled with one or more chemical compounds using loading techniques such as chemical reactions and physical deposition or a combination of both, as described above. These loading techniques preferably occur in the presence of water or an organic solvent, with the loading of the fibers preferably occurring upon contact of the chemical compounds with the cellulose fibers. More preferably, the loading techniques occur at ambient temperatures, or less than about 100° C. In the chemical loading process, several soluble components will dissolve in the pulp slurry and penetrate into the fiber cell walls. Reactions are triggered by changing pH, temperature, reagent dosages, radiation, pressure, ionic strengths, or other conditions. As a result, insoluble reaction products are formed and deposited inside the fibers. Examples of chemical deposition are described in U.S. Pat. Nos. 5,223,090 and RE 35,460, where soluble $Ca(OH)_2$ is first dissolved in a pulp slurry and then $CO_2$ gas is bubbled through the slurry. $Ca(OH)_2$ will react with $CO_2$ to form insoluble $CaCO_3$ inside the fibers. Fiber loading by physical deposition is usually accomplished without chemical reaction involvement. Often, the fiber loading is accomplished by a combination of both chemical and physical depositions.

Further details regarding the loading of fibers are described in Applicant's copending application entitled FIBER CEMENT COMPOSITE MATERIALS USING CELLULOSE FIBERS LOADED WITH INORGANIC AND/OR ORGANIC SUBSTANCES, Ser. No. 09/969,957, filed Oct. 2, 2001, the entirety of which is hereby incorporated by reference. Additional details regarding the fabrication of fiber cement articles using the formulations mentioned above are described below with respect to the sized fiber embodiments.

Biocide Treated Fibers

In another preferred embodiment, this invention relates to the addition of biocide treated fibers into cementitious cellulose reinforced composite materials. The biocide treated fibers generally comprise cellulose fibers incorporated with chemicals that inhibit microorganism growth. The biocide chemicals are preferably placed in the locations on the fiber where biological activities are most likely to occur. For example, biocide chemicals are preferably applied to the inner and outer surfaces of the water conducting channels and pores of the fiber where microorganisms are most likely to grow and to cause damages to the fibers. The fibers can be treated with biocide chemicals using chemical reaction and/or physical forces to bond or attach the chemicals to the surface of the cell walls of the fibers. The fiber treatment method may include pressure impregnation or concentration diffusion or other techniques with the aid of gradients of pressure, temperature, concentration, pH or other ionic strengths. Preferably, the biocide treatment occurs at ambient temperatures, or less than about 100° C. Advantageously, the biocide chemicals incorporated into the fibers retard or inhibit the microorganism growth and thus improve the biological resistance of the fibers. Since the fiber is the reinforcing agent, the improvement in the biological resistance of the fibers in turn enhances the durability of the fiber cement composite material. The dosage of the biocides in treating fibers is preferably in the range of 0.01% to 20% of the oven dry mass of the fibers, depending on the types of biocides, treatment processes and the final product requirements.

Selection of biocides for the fiber treatment and how to use the biocide treated fibers in the manufacturing of fiber reinforced cement material will now be described. The biologically active biocides selected for the fiber treatment preferably have strong affinities to cellulose fibers, do not interfere with cement hydration reactions, and do nor contaminate the process water. The effective biocides are preferably stable in the high temperature and alkaline conditions (pH>10). Moreover, the chemicals preferably provide some other beneficial attributes to the fiber cement composite materials. Many known biocides are not suitable for the fiber treatment due to these strict requirements. Biocide leaching out from the treated fibers and the products significantly limits the availability of the biocides applicable to the preferred embodiments. Surprisingly, several biocides meet the above requirements and provide good efficacy in combating the biological activities.

Chemicals that can be used as effective biocides for the fiber treatment include, but are not limited to, sodium, potassium, calcium, zinc, copper, and barium salts of carbonate, silicate, sulfate, halide, and borate in all forms; zinc carboxylates; boric acids; sodium dichromate; copper chrome arsenate (CCA); chromated copper borate (CBC); ammoniacal copper arsenate (ACA); ammoniacal copper zinc arsenate (ACZA); copper chromium fluoride (CFK); copper chromium fluoroborate (CCFB); copper chromium phosphorous (CCP); and other inorganic compounds.

Furthermore, organic compounds can also be used for the fiber treatment, including but not limited to propiconazole in various formulations; tebuconazole with a variety of formulations; organo-chloride such as pentachlorophenol (PCP); quaternary ammonium compounds (AAC); copper 8-hydroxyquinoline or copper oxene in various formulations; tri-n-butyltin oxide (TBTO) of all kinds of formulations; tri-n-butyltin naphthenate (TBTN) in various formulations; didecyldimethylammonium bromide (DDAB) in various formulations; didecyldimethylammonium chloride (DDAC) of all kinds in various formulations; and other fungicides of all kinds; algaecides of all kinds; and termite preservatives of all kinds.

The fibers are preferably treated with one or more biocides listed above, depending on the particular attributes needed for a specific application of the fiber cement material. The fiber treatment preferably occurs in the presence of water or an organic solvent, with the biocide treatment of the fiber, either through loading, chemical reaction or other mechanism, preferably occurring upon contact of the chemical compounds with the cellulose fibers. It can be appreciated that the above lists of chemicals are merely illustrative examples of substances that can be used for fiber biocide treatment. The chemicals can also be any other suitable inorganic or organic compounds that have inhibitory effects to fungal, bacterial, algae, and mold growth.

Further details regarding biocide treated fibers are described in Applicant's copending application entitled FIBER CEMENT COMPOSITE MATERIALS USING BIOCIDE TREATED DURABLE CELLULOSE FIBERS, Ser. No. 09/969,964, filed Oct. 2, 2001, the entirety of which is hereby incorporated by reference. The formulations of the biocide treated fibers are similar to that described above for the loaded fibers, with the loaded fibers being replaced with biocide treated fibers. Moreover, the methods of manufacturing building materials incorporating biocide treated fibers and other aspects are similar to that of the sized fibers, described below.

Sized Fibers

Having just described additional possible treatments, we now describe in further detail the sized fiber embodiment of the present invention and the use and application of sized fibers in fiber reinforced cement composite materials.

In another aspect of the invention, preferred embodiments describe the preparation and application of sized cellulose fibers in cementitious fiber reinforced composite materials. These embodiments encompass not only the composite materials formed with sized fibers, but also the formulation and the methods of manufacture of the composite materials, as well as the methods for chemically treating the fibers to improve the hydrophobicity of the fibers.

In one aspect, this invention relates to the incorporation of sized cellulose fibers into cementitious cellulose fiber reinforced building materials. The sized cellulose fibers generally comprise cellulose fibers treated with one or more sizing agents that permanently or temporarily block the hydrophilic sites on the inner and outer surfaces of the cellulose fibers. The sizing agents are preferably chemically bonded to the hydroxyl groups on the fiber surfaces in the presence of water or an organic solvent so as to bind the hydroxyl groups and substantially prevent the hydroxyl groups from reacting with water molecules. The chemical reaction between sizing agents and the hydroxyl groups preferably occurs upon contact of the sizing agent with the cellulose fibers.

FIG. 1 provides a schematic 100 illustrating a cellulose fiber 102 is treated with a sizing agent of one preferred embodiment. The cellulose fiber 102 comprises pores and water conducting channels that extend throughout the fiber 102. The inner and outer surfaces of the pores and water conducting channels contain numerous hydroxyl functional groups 104. When the fiber 102 is untreated, these hydroxyl groups 104 are likely to form hydrogen bonds with water molecules in the environment. The pores and conducting channels thus absorb water and facilitate the migration of water throughout the fiber.

As shown in FIG. 1, the fiber 102 of one preferred embodiment is treated with a sizing agent 106 to block the hydroxyl groups 104. Preferably, each sizing agent 106 comprises a hydrophilic functional group 108 and a hydrophobic functional group 110. Preferably, the hydrophilic groups 108 are chemically bonded to the hydroxyl groups 104, thereby preventing the hydroxyl groups 104 from reacting with water molecules. Moreover, the hydrophobic end groups 110 remain free and are attached to the fiber surface through the bonding between the hydrophilic group and the fiber surfaces. The outward hydrophobic groups 110 of the sizing molecules repel water from the fiber surface. In one embodiment, each sizing agent molecule 106 has a hydrophilic functional group comprising silanol (Si—OH) or polysilanol (Si—(OH)$_n$, where n=2, 3 or 4) and a hydrophobic functional group comprising straight or branched alkyl chains or aromatic fragments. The silanol or polysilanol may be resulted from the hydrolysis of hydrolysable alkoxy fragments that attach to a silicon element. The sizing agents 106 may be applied to the fiber surfaces using methods including vacuum deposition, pressure spraying, dipping or treating the fibers in aqueous or solvent solutions containing the sizing chemicals. Advantageously, the sizing agents that are deposited on the inner and outer surfaces of the fibers chemically bond with the hydrophilic sites such as the hydroxyl functional groups, thereby causing the surfaces to become less hydrophilic, which in turn inhibit the transfer of water along the water conducting channels and voids or pores.

Sizing agents may also react with inorganic and organic components in the fiber reinforced cement matrix and impart the matrix higher hydrophobicity. In the formation of fiber reinforced cement composite materials, the sized fibers may act as a carrier of the sizing agent. The sized fibers may release the chemical to the fiber's surrounding environments, imparting the environment with hydrophobicity as well.

Sizing Chemicals and Cellulose Fibers for Fiber Treatment

The chemicals selected for fiber sizing preferably meet strict product and process requirements, including that they are, but are not limited to being, alkali stable, UV stable, temperature stable, not interfering with cement hydration reactions, not contaminating the process water and not leaching out from the final products, etc. Chemical compounds that can be used as sizing agents include, but are not limited to:

organic resins such as natural or petroleum waxes, polyolefins, acrylics, epoxies, silane derivatives of all kinds and in all formulations, alkoxylsilane of all kinds and in various formulations, silicone emulsions of all kinds and in various formulations, acrylic latexes of all kinds, styrene butadiene rubber emulsions of all kinds, and other polymer latex and resins commonly used to alter surface characteristics of cellulose fibers;

water soluble sizing agents that are common to the paper industry such as rosin acids, alum, starches, gums, casein, soya protein, alkyl ketene dimers (AKD) of all kinds and in all formulations, alkenyl succinic anhydrides (ASA) of all kinds and in all formulations, stearic acids of all kinds and in all formulations.

The fibers are preferably treated with one or more compounds listed above, depending on the particular attributes needed for a specific application of the fiber cement composite material. Examples of commercially available chemicals that can be used include, but are not limited to:

Dow Chemicals Latex RAP900NA, PP722HS, and PB6638

Valspar EPS2718, EPS2708 and EPS2102

ChemRex Enviroseal 100, Enviroseal 100 plus, Enviroseal 40, Enviroseal 7, Hydrozo 100 and Hydrozo 100 plus Dow Coming Emulsions 2-7195 and 2-8002; Dow Coming polymers 2-8040 and 2-8630

Euclid Chemical Euco-Guard VOX, Eucon 37

Cresset Chemical Co. C-378

Clariant Prosil 9202

Pro-Seal DP-36

The sizing agents can be in a dry form such as powders, or wet form such as emulsions, dispersions, latexes and solutions. When multiple sizing agents are applied, some can be in dry form and others in wet form. Moreover, the sizing agent of the preferred embodiments may also include other chemicals that are traditionally used to size paper fibers as disclosed in U.S. Pat. No. 5,096,539, which is hereby incorporated by reference in its entirety. Whether the sizing agents are in dry form or in wet form, when caused to react with the hydroxyl groups on the fibers, the reaction preferably occurs in the presence of water or an organic solvent to facilitate the reaction. It can be appreciated that the above lists of chemical compounds are merely illustrative examples of substances that can be used for sizing the fibers. The sizing agents can also be any other suitable inorganic or organic compounds, or combinations thereof, depending on the particular attributes needed for the specific application of the fiber cement material.

Cellulose fibers that are used for fiber sizing treatments can be made by various pulping methods, as described with respect to the loading of fibers above. In the pulping process, wood or other lignocellulosic raw materials such as kenaf, straw, and bamboo, etc., are reduced to a fibrous mass by the means of rupturing the bonds within the structures of lignocellulosic materials. This task can be accomplished chemically, mechanically, thermally, biologically, or by combinations of these treatments. Based on the chemicals utilized in the process, the chemical pulping methods are classified as Soda, Kraft, Kraft-AQ, Soda-AQ, Oxygen Delignification, Kraft-Oxygen, Organic Solvent methods, and Sulfite pumping, steam explosion or any other pulping techniques. In the chemical pulping method, lignin, which acts as glue holding cellulose and hemicellulose together to provide mechanical strength in the wood, is broken and dissolved by chemical reactions.

These pulping reactions are usually carried out in a reactor, often called a digester, under a high temperature around 150 to 250° C. for about 30 minutes to 2 hours. The cleavage of the bonds between lignin and cellulosic components results in weakening of the bonds among fibers. With aids of mild mechanical forces, cellulose fibers are then separated into individual fibers. The cellulose fibers used for sizing treatment are preferably individualized fibers made by various methods mentioned above.

The cellulose fibers for sizing treatment can be unrefined/unfibrillated or refined/fibrillated cellulose pulps from sources, including but not limited to bleached, unbleached, semi-bleached cellulose pulp produced by various pulping techniques. The cellulose pulps can be made of softwood, hardwood, agricultural raw materials, recycled waste paper or any other forms of lignocellulosic materials.

Fiber Treatment

Various methods can be used to treat/size cellulose fibers with one or more sizing agents. A preferred fiber treatment method generally includes the following steps performed in various sequences:

fiber dispersion/fiberization (individualizing fibers);

fibrillation (mechanical means to increase fiber surface area);

fiber conditioning (dewatering, drying or dilution);

treatment/sizing reactions with one or more sizing agents;

removal of residual/excessive sizing agents; and conditioning of the sized fibers (drying, humidifying or dispersing).

Some of these steps can be omitted or some other steps may be desirable. The fiber treatment method can be carried out by various means including but not limited to treatments in aqueous or organic solvent solutions, and/or treatments by vacuum or pressure spraying of the sizing agents on dried or wet cellulose fibers.

Fiber Treatment in Solution

Figure 2:
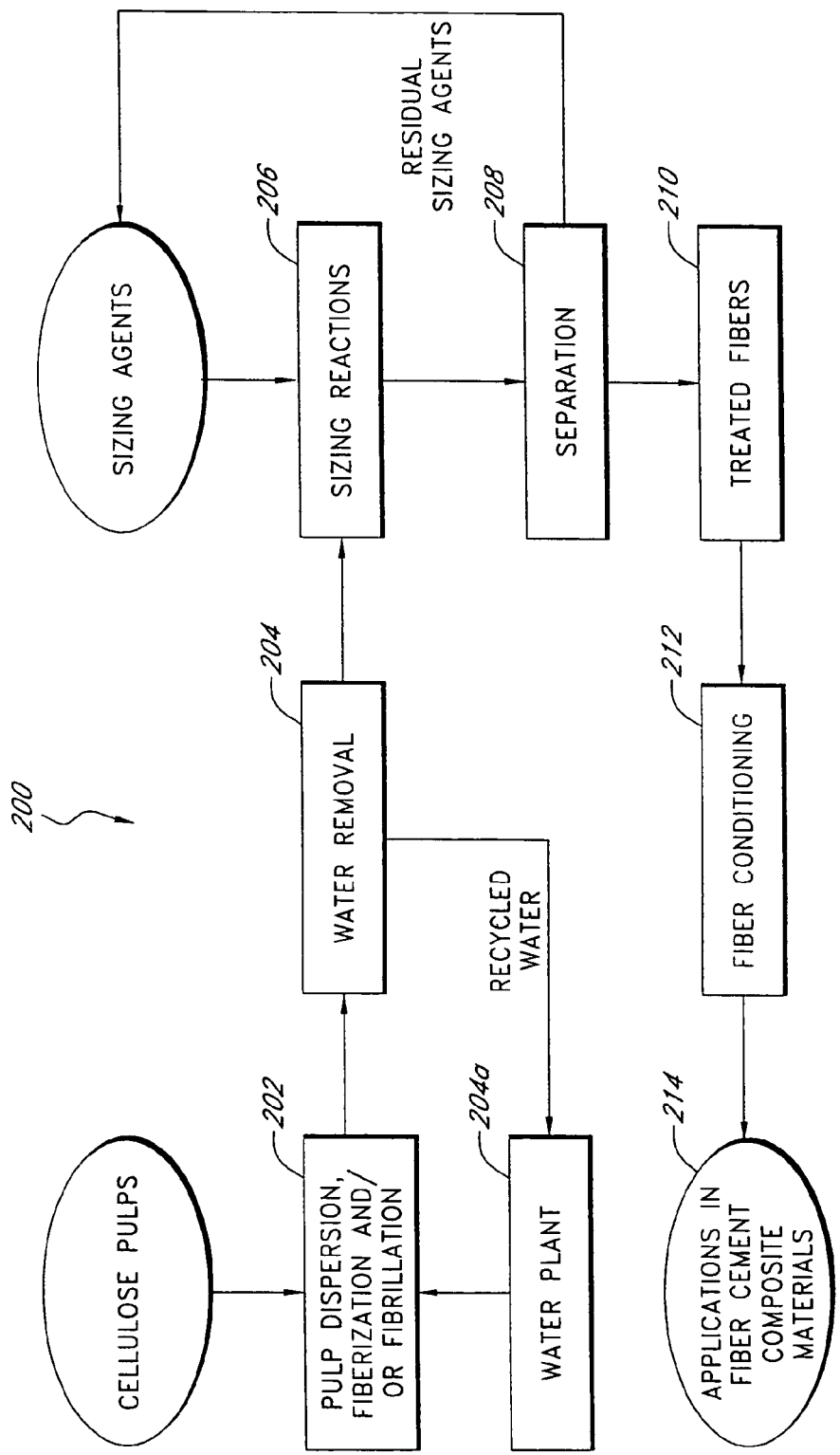
FIG. 2 illustrates an exemplary process flow of one embodiment of treating fibers with sizing agents in solution.

FIG. 2 illustrates an embodiment of preferred fiber treatment process 200 that is carried out in solution. The process 200 begins with step 202 in which untreated cellulose fibers are dispersed, fiberized (individualized) and/or fibrillated. Individualizing of fibers can occur by a chemical pulping process such as described above. Alternatively, it will be appreciated that in performing this preferred manufacturing process, the chemical pulping step may not be necessary. This is because chemical individualization of fibers is often done by the fiber manufacturer, who then provides the fibers to the buyer on standard lap sheets or rolls. Thus, in one embodiment, the individualization of such fibers merely includes mechanically separating the fibers from the sheets or rolls, such as by hammer milling or other methods.

In one embodiment, the untreated cellulose fibers are received in dry form (laps and rolls) or in wet forms (wet laps and in containers). Preferably, the untreated fibers are dispersed at a consistency of about 1% -6% to form pulp slurry in a hydrapulper, which also imparts some fibrillation. Further fibrillation can be achieved using a refiner or a series of refiners. Once dispersed, the fibers are then fibrillated to a range of about 100 to 750 degrees of Canadian Standard Freeness (CSF). Dispersion and fibrillation can be achieved by other techniques such as, for example, deflaking, milling, and shredding. Treatment of cellulose fibers without fibrillation is also possible. In some embodiments, unfibrillated fibers are preferred.

In the embodiment shown in FIG. 2, subsequent to dispersing the fibers in step 202, the process 200 continues with step 204 in which fibrillated or unfibrillated fibers in slurry forms are then de-watered using press filtration, vacuum filtration or continuous centrifugation to a total solid content of about 2% to 50%. Further de-watering of the fibers can be accomplished by vacuum evaporation drying, flash drying, freeze drying, low temperature oven drying, and other drying techniques that do not pose significant damages to the fiber integrity. In one embodiment, the de-watered fibers are thoroughly mixed in a reactor vessel using dispensers, mixers, or hydra-pulpers of any kind. As shown in FIG. 2, the water from the dewatering step 204 can be recycled to the water plant 204a and circulated back to step 202.

The process 200 then follows with step 206 in which sizing reactions are carried out. Preferably, prepared sizing agents are added to the reactor while constant agitation and mixing are applied. Dosages of the sizing agents are dependent on intended applications of the treated fibers, the types of the sizing chemicals and reaction conditions. In one embodiment, the dosages are within a range of about 0.01% to 50% weight of the oven dried cellulose fibers. The reactor systems are preferably equipped with some kinds of agitation devices to ensure a good mixing.

The sizing reactions can be carried out in the ambient or at an elevated temperature up to about 200° C., more preferably about 0° to 100° C. Higher pressures and temperatures are preferred for some treatment. The retention time varies from about a few seconds to 24 hours, depending on the degree of sizing desired, the types and dosages of sizing chemicals used, the types of cellulose fibers, and other reaction conditions. Batch or continuous reactors of all kinds can be used but continuous or semi-continuous tank or plug flow reactors are preferred for the fiber treatment in this embodiment.

After a predetermined retention time is reached, the residual sizing agents can be separated and removed by centrifugation or filtration as shown in step 208 of the process 200. In one embodiment, the residual sizing agents are recycled and reused. The post reaction fibers with a total solid content of approximately 2% to 80% can be further treated and conditioned as in steps 210 and 212 of the process 200. Preferably, the post reaction fibers are dried by low temperature oven, vacuum evaporation, and other nondestructive drying techniques. In one embodiment, the treated fibers are conditioned to a total solid of about 4% to 90% and then incorporated into fiber cement composite materials in step 214.

TABLE 1

Sizing Treatment Conditions of Most Embodiments

| Parameters | Ranges | More Preferable |
|---|---|---|
| Percent of Fibers in Slurry (% by weight) | about 0.01 to 50 | about 3 to 30 |
| Fiber Freeness after Fibrillation (CSF) | about 100 to 750 | about 150 to 650 |
| Dosage of Sizing Agents (% by weight) | about 0.01 to 50 | about 0.1 to 10 |
| Reaction Temperature (° C.) | about −20 to 200° C. | about 0 to 100° C. |
| Reaction Pressure (atm) | about 1 to 10 | about 1 to 2 |
| Retention Time (seconds) | about 5 to 100,000 | about 5 to 3,600 |

Table 1 provides examples of reactions conditions of the fiber treatment process 200 described above. However, various changes and modifications in the conditions can be made from the embodiments presented herein without departing from the spirit of the invention.

Fiber Treatment by Dry Spray

Figure 3:
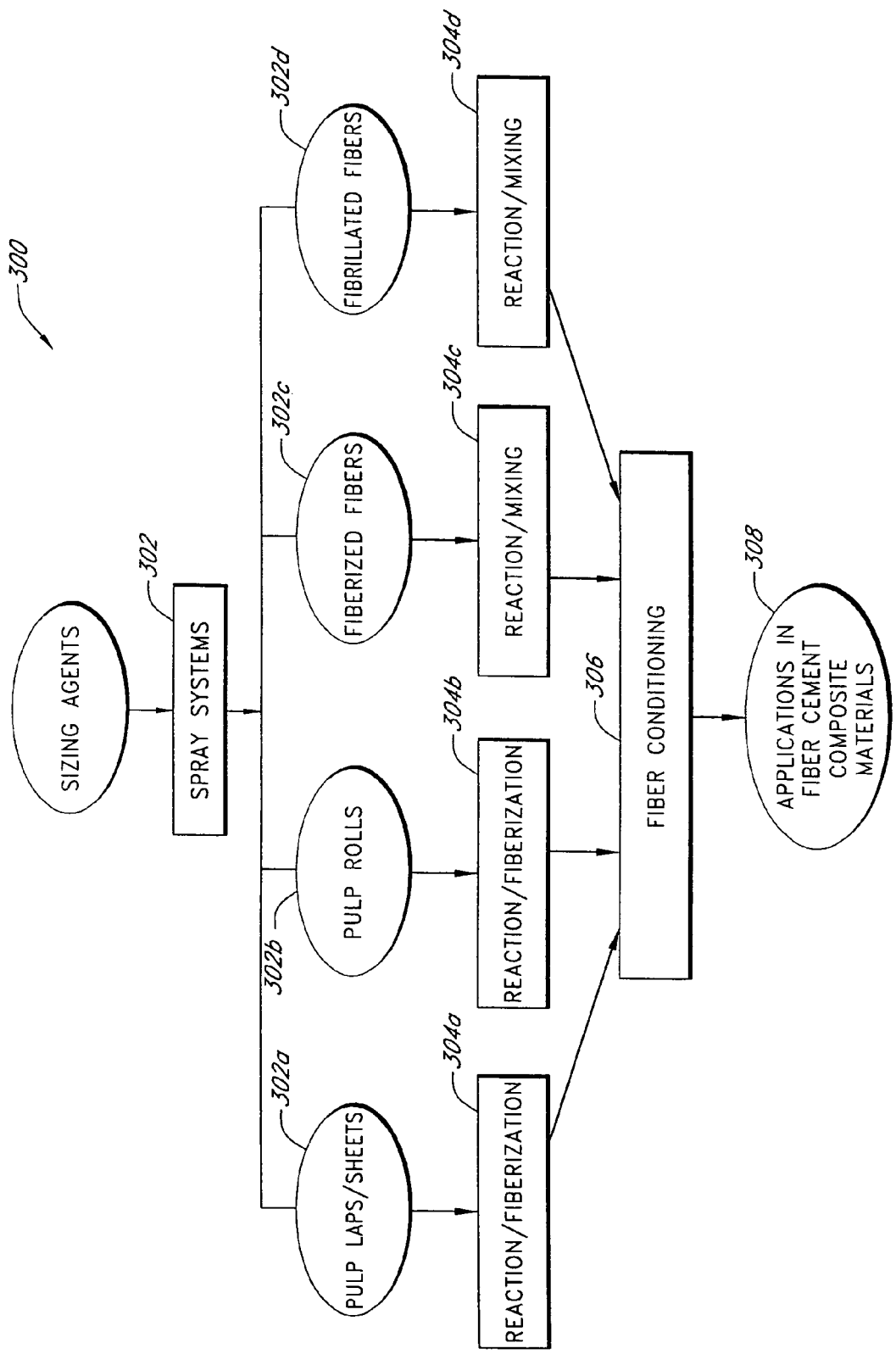
FIG. 3 illustrates exemplary process flows of several embodiments of treating fibers with sizing agents using a dry spray process.

FIG. 3 illustrates several embodiments of treating fibers by dry spraying. The process 300 begins with step 302 in which the raw materials are prepared for the treatment. The untreated fibers can be received in various forms such as pulp laps (sheets) in bales 302a; pulps sheets in rolls 302b; fiberized (by hammermill or shredded) fibers in bales, containers, or silos 302c; fibrillated (refined) dry or semi-dry fibers in bales, silos or containers 302d; and other dry forms of cellulose fibers.

As shown in FIG. 3, in the step of treating pulps in forms of rolls or laps/sheets 302a and 302b, emulsified sizing agents are sprayed onto cellulose fibers as shown in steps 304a and 304b. The sizing reactions may be carried out before, during or after fiberization (individualization) process. In these spraying systems, the sizing agents may be vaporized and the vaporized chemicals may be pressurized to provide enough spraying velocities. Some carrying gases may be used for spraying the sizing chemicals in latex emulsions. Preferably, the nozzles are selected to generate the finest spraying particles possible. It will be appreciated that even for a dry spraying process, the reaction of the sizing agents with the fibers still takes place in the presence of water or an organic solvent due to the composition of the spray itself.

In another embodiment of this treatment, sizing agents are applied onto pulp laps, rolls or sheets by dipping the pulp webs in solutions of the sizing agents. After a predetermined retention time to allow sizing reactions to take place, the pulps are then individualized or fiberized by techniques such as hammer milling, shredding, roller milling, deflakering, or refining. Sizing reactions and fiberization can also be carried out at the same time by spraying the chemicals on to the fibers during fiberization processes. As FIG. 3 further shows, in treating fiberized fibers 302c, sizing agents will be sprayed onto the fiberized fibers as shown in step 304c. The sizing reactions are allowed to take place in a reactor with vigorous agitation/mixing. The sizing treatment can also be carried out in systems such as flash dryers, hammermills, conventional resin application chambers, or closed mixing tank reactors.

In yet another embodiment, fibrillated cellulose fibers in a dry form can be used in the fiber treatment 304d. In preparation of dry fibrillated fibers, cellulose pulp is refined using conventional hydra-pulpers, pulp refiners or deflakers. The fibrillated fibers are then de-watered and/or dried using techniques such as flash drying and air drying. The wet or dry fibrillated fibers are then brought to contact with desirable sizing agents in a reactor. The sizing treatment of these embodiments can be carried out at room temperature or elevated temperatures under the atmospheric or elevated pressures. The retention time for the treatment may vary to accommodate the process and equipment, preferably 5 seconds to 12 hours. The dosages of the sizing agents are preferably in the range of about 0.01% to 20% of oven dried fibers.

As shown in FIG. 3, the treated fibers are subsequently conditioned in step 306. The treated fibers can be conditioned by techniques such as drying, humidifying, and dispersing. After conditioning the fibers, the sized fibers are further processed. The sized fibers are dispersed or fibrillated. In some cases, fibrillation may not be required. The sized fibers are then incorporated into the manufacture of fiber cement composite materials in step 308.

The sizing chemicals may be applied directly in the process of making fiber cement composite materials as will be described in greater detail below. Preferably, the sizing chemicals are added to the fiber before mixing with other ingredients.

Formulation of Making Fiber Reinforced Cement Materials Using Sized Fibers

Most of the embodiments described herein can be encompassed by the following formulation:
- about 10%-80% cement (cementitious binder);
- about 20%-80% silica (aggregate);
- about 0%-50% density modifiers;
- about 0%-10% additives; and
- about 0.5%-20% sized cellulose fibers or a combination of sized cellulose fibers, and/or regular unsized fibers, and/or natural inorganic fibers, and/or synthetic fibers;

The cementitious binder is preferably Portland cement but can also be, but is not limited to, high alumina cement, lime, high phosphate cement, and ground granulated blast furnace slag cement, or mixtures thereof. The aggregate is preferably ground silica sand but can also be, but is not limited to, amorphous silica, micro silica, diatomaceous earth, coal combustion fly and bottom ashes, rice hull ash, blast furnace slag, granulated slag, steel slag, mineral oxides, mineral hydroxides, clays, magnasite or dolomite, metal oxides and hydroxides and polymeric beads, or mixtures thereof.

The density modifiers can be organic and/or inorganic lightweight materials with a density of less than about 1.5 g/cm$^3$. The density modifiers may include plastic hollow materials, glass and ceramic materials, calcium silicate hydrates, microspheres, and volcano ashes including perlite, pumice, shirasu basalt and zeolites in expanded forms. The density modifiers can be natural or synthetic materials. The additives can include, but are not limited to, viscosity modifiers, fire retardants, waterproofing agents, silica fume, geothermal silica, thickeners, pigments, colorants, plasticizers, dispersants, forming agents, flocculents, drainage aids, wet and dry strength aids, silicone materials, aluminum powder, clay, kaolin, alumina trihydrate, mica, metakaolin, calcium carbonate, wollastonite, and polymeric resin emulsion, or mixtures of thereof.

The cellulose fibers used for reinforcing cement composite materials are preferably predominantly individualized sized fibers and are made by various chemical pulping methods, which rely mainly on the effects of chemicals to separate fibers, as described above. In some embodiments, the cellulose fibers used for preparation of sized fibers are individualized cellulose fibers with partial or complete removals of lignin components from the fiber cell walls. In other embodiments, the cellulose fibers used are not individualized cellulose fibers in which the lignin components stay intact.

Sized cellulose fibers can be used in a variety of composite materials all having different proportions of cementitious binders, aggregates, sized and/or unsized fibers, and additives to obtain optimal properties for a particular application. In one embodiment, the composite formulation contains about 0.5% to 20% sized fibers by weight. Furthermore, the sized fibers may be blended with conventional unsized fibers and/or synthetic polymer fibers in different proportions. It will be appreciated that the percentage of sized cellulose fibers may be varied depending on the desired application and/or process. Furthermore, the proportion of the cementitious binder, aggregate, density modifiers, and additives can also be varied to obtain optimal properties for different applications, such as roofing, deck, paving, pipes, siding, trim, soffits, backer for tile underlayment.

In preferred embodiments of the present invention, when the building material is to be autoclaved, a lower amount of cement in the formulation is used incorporating sized cellulose fibers. The formulation for the autoclaved fiber cement composite materials preferably comprises:
- about 20-50% cement, more preferably about 35%;
- about 30-70% fine ground silica, more preferably about 60%;
- about 0-50% density modifiers;
- about 0-10% additives, more preferably about 5%; and
- about 0.5-20% fibers, more preferably about 10% fibers, wherein some fraction of the fibers is cellulose fibers sized with sizing agents to increase the hydrophobicity of the fibers.

Alternatively, for an air-cured product, a higher percentage of cement can be used, more preferably about 60-90%. In an air-cured embodiment, the fine ground silica is not used, although silica may be used a filler.

Preferably, the sized fibers have a freeness of about 150 to 750 degrees of Canadian Standard Freeness (CSF) in accordance with TAPPI method T 227 om-99. The cementitious binder and aggregate have surface areas of about 250 to 400 m$^2$/kg and about 300 to 450 m$^2$/kg, respectively. The surface area for both cement and aggregates is tested in accordance with ASTM C204-96a.

Method of Making Fiber Cement Building Materials Using Sized Fibers

A method of manufacturing a fiber reinforced composite building material using the formulations described constitutes another aspect of the present invention. A preferred process of manufacturing a fiber reinforced cementitious composite material incorporating sized cellulose fibers begins with treating or sizing cellulose fibers in which the inner and outer surfaces of the fibers are made substantially hydrophobic. After preparing the sized fibers, in one embodiment the method further comprises dispersing the sized fibers at a pre-selected consistency, fibrillating the sized fibers to a pre-selected freeness range, mixing the sized fibers with ingredients to form a fiber cement mixture in accordance with preferred formulations, forming the fiber cement mixture into a fiber cement article of a pre-selected shape and size, and curing the fiber cement article so as to form the fiber reinforced composite building material.

The sizing agents may be applied to any of above steps. In some embodiments the chemicals are added to fibers first to allow enough time for the reactions to take place. Sizing agents can be used to coat or impregnate the formed fiber cement article surfaces to impart water repellency of the final products.

Preferably, the step of mixing the sized fibers with other ingredients to form a fiber cement mixture comprises mixing the sized fibers with non-cellulose materials such as a hydraulic binder, aggregate, density modifiers, and additives in accordance with the preferred formulations of this invention. In some embodiments, the sized fibers can also be mixed with synthetic fibers along with the other ingredients. The fabrication processes can be any of the existing technologies, such as Hatcheck process, extrusion, and molding, etc.

Figure 4:
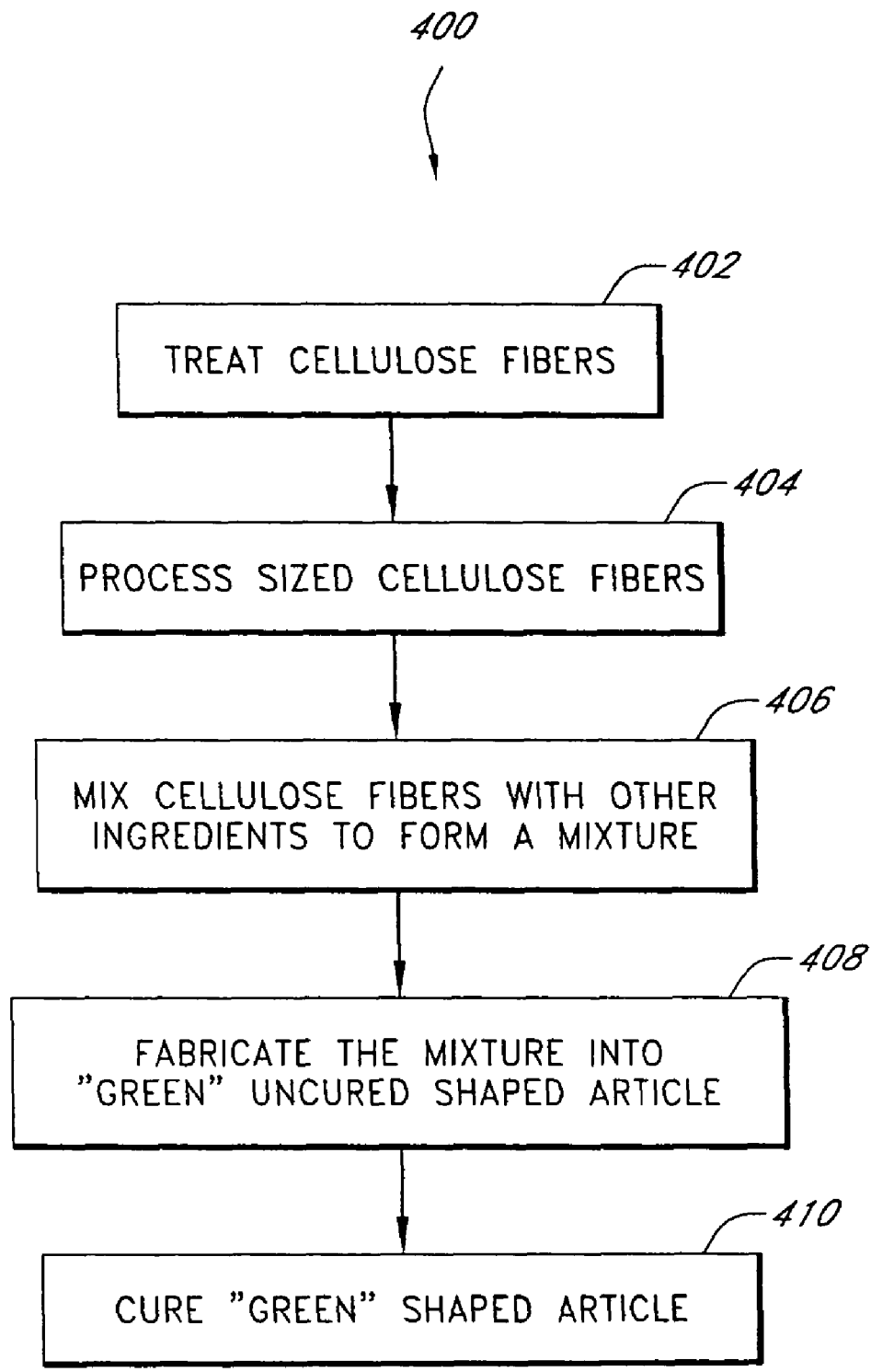
FIG. 4 illustrates an exemplary process flow of one embodiment of making fiber reinforced cement composite materials.

FIG. 4 illustrates a preferred process 400 of manufacturing a fiber reinforced cementitious composite material incorporating the sized cellulose fibers. As FIG. 4 shows, the process begins with step 402 in which the cellulose fibers are treated with sizing chemicals to impart the fibers with hydrophobicity. A pre-prepared sized fiber may be used. The fibers may be individualized prior to sizing, during sizing or after sizing.

The sized fibers are subsequently processed in step 404. The fiber processing step 404 typically involves fiber dispersion and fibrillation. In one embodiment, the fibers are dispersed at a consistency of about 1% to 6% in a hydra-pulper, which also imparts some fibrillation. Further fibrillation can be achieved using a refiner or series of refiners. Once dispersed, the fibers are then fibrillated to a range of about 100 to 750 degrees of CSF (Canadian Standard Freeness), more preferably between about 180 to 650 degrees of CSF. Dispersion and fibrillation can also be achieved by other techniques such as hammer-milling, deflakering, shredding, and the like. Furthermore, use of sized fibers without fibrillation is also acceptable for some products and processes.

As FIG. 4 shows, in step 406, the sized cellulose fibers are proportionally mixed with the other ingredients to form a waterborne mixture, slurry, or paste. The sized fibers are mixed with cement, silica, a density modifier and other additives in a well-known mixing process to form a slurry or paste. In the mixer synthetic fibers can be blended with the sized fibers.

The process 400 follows with step 408 in which the mixture may be formed into a "green" or uncured shaped article using a number of conventional manufacturing as would be known to one of skillful in the art, such as the:

Hatschek sheet process;
Mazza pipe process;
Magnani process;
Injection molding;
Extrusion;
Hand lay-up;
Molding;
Casting;
Filter pressing;
Fourdrinier forming;
Multi-wire forming;
Gap blade forming;
Gap roll/blade forming;
Bel-Roll forming;
Others.

These processes may also include a pressing or embossing operation after the article is formed. More preferably, no pressing is used. The processing steps and parameters used to achieve the final product using a Hatschek process are similar to what is described in Australian Patent No. 515151.

Following step 408, the "green" or uncured shaped article is cured in step 410. The article is preferably pre-cured for up to about 80 hours, most preferably about 24 hours or less. The article is then air-cured for approximately 30 days. More preferably, the pre-cured articles is autoclaved at an elevated temperature and pressure in a steam saturated environment at about 60 to 200° C. for about 3 to 30 hours, more preferably about 24 hours or less. The time and temperature chosen for the pre-cure and cure processes are dependent on the formulation, the manufacturing process, the process parameters, and the final form of the product.

Fiber Reinforced Cement Composite Materials Using Sized Cellulose Fibers

Applications of sized cellulose fibers in fiber reinforced composite materials can improve the mechanical and physical properties of the final building product. Fiber cement products using sized cellulose fibers have improved dimensional stability, lower water migration (wicking), reduced water absorption rate and final mass, improved efflorescence and improved freeze-thaw resistance. The use of sized cellulose fibers also does not compromise the physical and mechanical properties of the product. In some embodiments the sized fibers will provide similar or even better physical and mechanical properties than those using conventional, unsized cellulose fibers. The following examples demonstrate some of desirable characteristics that the sized fibers provide in the formulations of the fiber reinforced cement composite materials. It will be appreciated that the fiber cement formulations are selected for comparison purposes only and that a variety of other formulations can be used without departing from the scope of the present invention. It will also be appreciated that in addition to fiber cement products, other cementitious materials may also use sized fibers in the formulation to improve the mechanical and physical properties of the material.

EXAMPLE 1

Unbleached Kraft softwood pulp was pre-refined to 500 CSF before the treatment and the refined pulp was used for the sizing treatment. The sized fiber was prepared by treating the refined fiber with alkylsiloxane (Chem-Rex Enviroseal 100) for one hour at 4% of pulp consistency. The dosage of the sizing agent was 10% of the fiber mass and the reaction temperature was ambient under atmospheric pressure. Specimens of fiber cement composite materials were then formed using laboratory apparatus. The formulation for samples A and B, as well as C, D, E, F and G of the following examples are the same: 8% fiber (treated/sized fiber or regular untreated fiber), 35% Portland cement and 57% ground silica. The specimens were air cured for 8 hours at ambient temperature, followed by autoclaving at 180° C. for 12 hours. The physical and mechanical properties of the samples A and B are shown in Table 2.

TABLE 2

Comparison of Physical Properties of Fiber Cement Materials with Sized Cellulose Fibers and Regular Cellulose Fibers

| Physical Properties | Samples | |
| --- | --- | --- |
|  | A | B (Control) |
| MOR (MPa) | 7.15 | 8.00 |
| Strain (μm/m) | 5790 | 5480 |
| MOE (GPa) | 2.78 | 4.69 |
| Toughness (KJ/m$^3$) | 2.50 | 3.38 |
| Saturated Density | 1.48 | 1.61 |
| Moisture Expansion (%)** | 0.19 | 0.20 |

*Measured after saturating the material in water for more than 48 hours.
**Moisture expansion is the change in product length oven dry to saturated conditions. The percent change (%) of moisture expansion is:

$$\text{Moisture Expansion}(\%) = \frac{\text{Length}_{Saturated} - \text{Length}_{Oven\ Dry}}{\text{Length}_{Oven\ Dry}} \times 100$$

Table 2 above provides an illustrative comparison of various mechanical and physical properties of fiber cement products made with formulations that incorporate sized cellulose fibers and those that use conventional, unsized cellulose fibers. MOR, strain, MOE and toughness were tested under the wet condition in accordance with ASTM (American Standard Test Method) C1185-98a entitled "Standard Test Methods for Sampling and Testing Non-Asbestos Fiber-Cement Flat Sheet, Roofing and Siding Shingles, and Clapboards." Formulation A includes sized cellulose fibers while Formulation B uses conventional, untreated cellulose fibers. Specimens prepared by Formulations A and B have an oven dry density of 1.3 grams per cubic centimeter. It will be appreciated to one of skill in the art that the specific values of particular mechanical properties will differ by varying the oven dry density.

As shown in Table 2, the strain is higher and saturated density is lower for fiber cement materials made with sized fibers. Although there is a reduction in modulus of rupture (MOR) and modulus of elasticity (MOE), this embodiment of the invention reduces the saturation density by approximately 8% compared to the equivalent formulation made without sized fibers. An equivalent formulation is herein defined as one in which the preferred treated cellulose fibers are displaced by an equivalent percentage of untreated cellulose fibers. It will be appreciated that an approximately 5% or more reduction in the saturated density of the formulation with sized fibers can be obtained as compared to an equivalent formulation without sized fibers, depending on the sizing treatment on the fiber. The wet-dry dimensional stability is slightly improved for the fiber cement composite materials with the sized fibers in the formulation.

EXAMPLE 2

Figure 5:
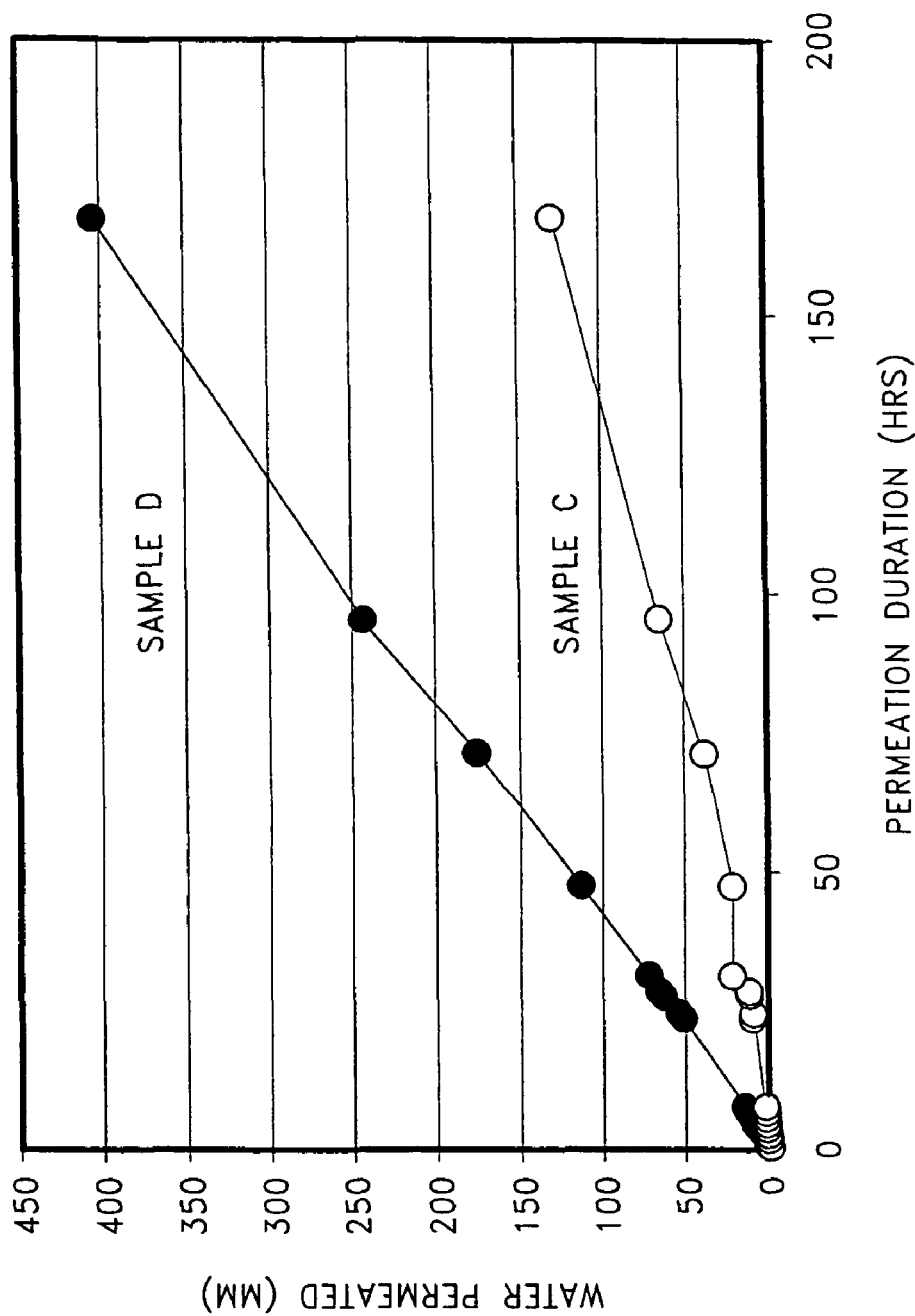
FIG. 5 is a graph illustrating water permeability test results of fiber cement building materials made with sized fibers in accordance with one preferred embodiment and fiber cement material made with conventional, un-sized fibers.

FIG. 5 illustrates the results from a water permeability test. Sample D is the control incorporating conventional unsized cellulose fibers while Sample C is made with a formulation containing cellulose fibers that are treated with acrylic latex (Valspar EPS2718) at a dose of 5% of fiber mass. Sizing reaction is carried out at ambient temperature for 30 minutes. The oven dry density of Sample C and D is about 1.3 grams per cubic centimeter.

The water permeability test comprises attaching a tube to a surface of the sample material in a manner such that one end of the tube is positioned adjacent the surface of the material sample. The tube is made of an acrylic material that is about 125 mm long and has an inner diameter of about 50 mm. After the samples are pre-conditioned to equilibrium under 23+/−2° C. and 50+/−5% relative humidity, the tube is filled with water and the water level inside the tube is periodically recorded. The decrease in the water level in the tube is recorded as water permeated (mm). As FIG. 5 shows, after 168 hours (7 days) of testing, Sample C had 128 mm of water penetrated through as compared to 400 mm for the control (Sample D). The water permeability of sample materials made with sized fibers using Formulation C has been reduced to about 30% of that of a sample material made with an equivalent formulation in accordance with Formulation D. An equivalent formulation is herein defined as one in which the preferred sized cellulose fibers are replaced by an equivalent percentage of conventional, unsized cellulose fibers.

It will be appreciated that the reduction in water permeability described above is merely an exemplifying result. By varying the amount and/or composition of sized fibers, it will be appreciated that the water permeability after 168 hours of testing can be reduced by up to 3 times as compared to an equivalent formulation made without sized fibers.

Advantageously, reduced water permeability makes the sized fiber material particularly suitable for exterior applications such as roofing, piping, and decking. Reduced water transport inside the fiber reinforced cement composite materials will slow down the migration of the dissolvable chemicals in the fiber cement matrix and reduce the efflorescence phenomenon of the final products.

EXAMPLE 3

Freeze-thaw resistance refers to a material's resistance to damage due to water and temperature effects when exposed to repeated cycles of freezing and thawing. For concrete cement materials, the damage usually starts with flaking at the surface and gradually extends inward. Sometimes deep cracks may occur. The damage associated with freezing generally does not occur unless a sufficient quantity of water is present in the pores. It is well known that freeze-thaw damage in concrete is minimal when the concrete materials have low water to cement ratio and low permeability.

Figure 6:
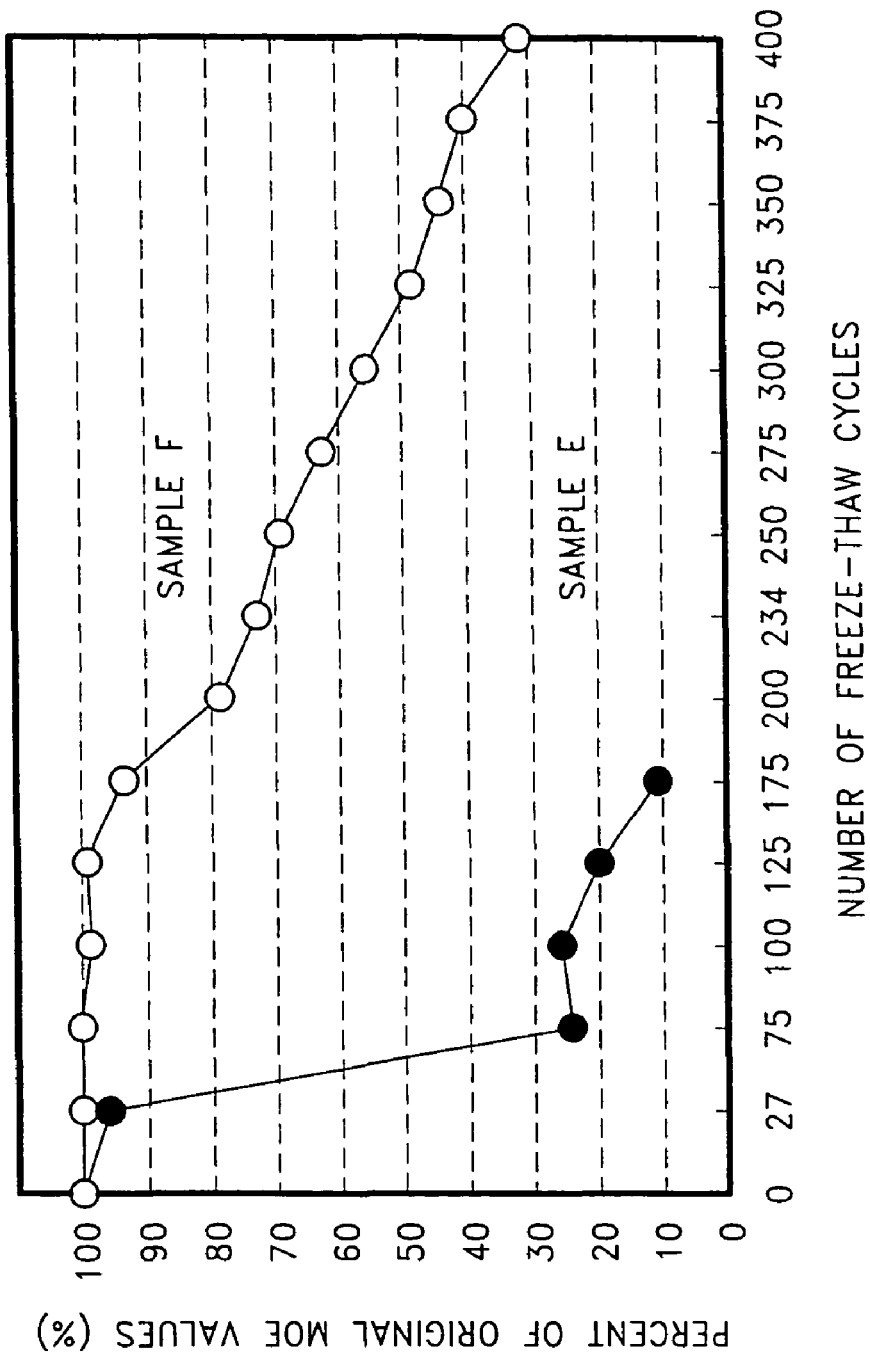
FIG. 6 is a graph illustrating freeze-thaw cycle results of fiber cement building material made with sized fibers in accordance with one preferred embodiment and fiber cement material made with conventional, un-sized fibers.

One advantage of the preferred embodiments is that the final products have improved freeze-thaw resistance as shown in FIG. 6. Sample E contains regular, unsized cellulose fibers and Sample F has the fibers treated/sized with a silicone emulsion that contains a number of compounds including n-octyltriethoxysilane, n-octyltrimethoxysilane, and n-octadecyltriethoxysilane and n-decyltriethoxysilane, etc. The unbleached Kraft pulp was fibrillated into about 450 CSF. The chemical dosage was 10% of the fiber mass. The fiber treatment was carried out at 30% fiber consistency for 1 hour at ambient temperature. The oven dry density of Sample E and F is about 1.3 grams per cubic centimeter.

Laboratory fiber cement composite specimens were subjected to freeze-thaw testing in accordance with the procedure A of ASTM (American Standard Test Method) C666A titled "Standard Test Method for Resistance of Concrete to Rapid Freezing and Thawing." According to the procedure A, the specimens are submerged in water for both rapid freezing and thawing; the specimens are periodically removed from freeze-thaw cycling, tested for MOE, and visually inspected for damage such as splitting, cracking, moisture expansion, and sponginess/wetting throughout the specimen; specimens are removed from the testing cycling when the degree of damage is such as that the sample does not hold together and would not be functional as a building product. When subjected to this test, Sample E (with regular cellulose fibers) failed after 70 freeze-thaw cycles, compared to 320 cycles for Sample F, an equivalent formulation with the sized fibers. An equivalent formulation is herein defined as one in which the preferred sized cellulose fibers are displaced by an equivalent percentage of conventional and unsized cellulose fibers. As FIG. 6 shows, the freeze-thaw performance increased by more than 4 times by using this sized fiber. Thus, Applicants have found that the freeze thaw performance of a building material formulation incorporating sized fibers as measured by ASTM C666A can easily be improved by about 25% or more as compared to an equivalent formulation without sized fibers. More preferably, the use of sized fibers can increase the number of cycles to failure to more than about 200 cycles, more preferably more than about 300 cycles.

Figure 7:
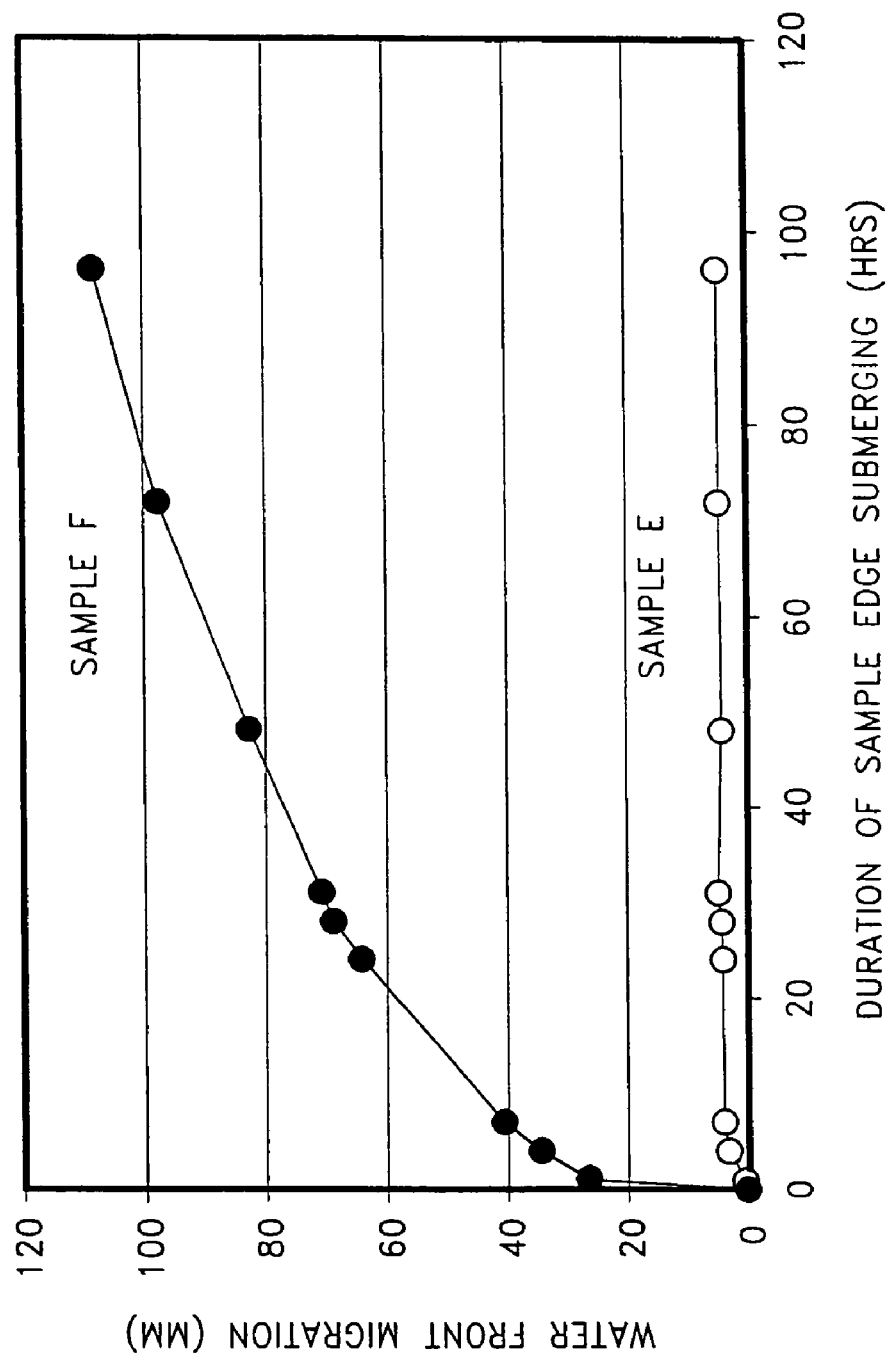
FIG. 7 is a graph illustrating water migration test results of fiber cement building material made with sized fibers in accordance with one preferred embodiment and fiber cement material made with conventional, un-sized fibers.

FIG. 7 displays graphical results of water migration (wicking) tests performed on materials made with sized cellulose fibers (Sample E) and with conventional, unsized cellulose fibers (Sample F). The water migration test comprises submerging the edges of each sample material in water and then measuring the distance of water front migration at different testing duration. FIG. 7 shows that after 24 hours of testing, the sized cellulose fibers reduced the water migration of the building product by about 15 times as compared to a building product made from an equivalent formulation without sized cellulose fibers. After 96 hours of submerging the sample edge in water, the distances of water front migration were approximately 4 mm and 107 mm for Samples E and F, respectively. Advantageously, minimizing water migration significantly reduces the stress caused by water-induced swelling of the material and thus reduces the occurrence of cracks and fractures caused by the buildup of such stress. Thus, it will be appreciated that a building material formulation incorporating sized fibers can be developed exhibiting approximately a 25% improvement or more in water migration or wicking as compared to an equivalent formulation made without sized fibers. In one embodiment, the water migration of the sample according to this test is less than about 50 mm after 96 hours, more preferably less than 30 mm, and even more preferably less than about 20 mm.

EXAMPLE 4

In this example a bleached Kraft softwood fiber was first fiberized in dry form by a hammermill. A portion of the fiberized fiber was used as the control and another portion was treated with sizing agent of n-octyltriethoxysilane by spraying the chemical onto the fibers. The treatment was carried out at ambient temperature and under the atmospheric pressure. The dosage of n-octyltriethoxysilane was 5% of the fiber mass. Fiber cement composite specimens were fabricated using an extrusion process. The formulation for the samples G and H was the same except different fibers were used. The formulation contained 10% fibers (the sized fiber for sample G or regular cellulose fibers for H), 10% calcium silicate hydrate (a density modifier), 1.5% methylcellulose (additive-viscosity modifier), 39.25% Portland cement and 39.25% ground silica. The extruded samples were cured by autoclaving at 180° C. for 24 hours. The density of Sample G and H is around 0.9 grams per cubic centimeter.

TABLE 3

Physical Properties of Fiber Cement Composite Materials with Sized Cellulose Fibers and Regular Cellulose Fibers (the composite material samples were prepared by extrusion process)

| Physical Properties | Samples | |
|---|---|---|
| | G (with sized fiber) | H (with regular fiber) |
| MOR (MPa) | 6.08 | 6.83 |
| Strain (μm/m) | 9354 | 5467 |
| Toughness (KJ/m$^3$) | 0.44 | 0.38 |
| Water Absorption (% wt) after 24 hours of testing | 35 | 45 |
| Moisture Expansion (%)* | 0.54 | 0.63 |

*Moisture Expansion was done after 24 hours of carbonation.
**Mechanical tests (MOR, Strain and Toughness Energy) were done under the equilibrium condition of 50+/−5% relative humidity and 23+/−2° C.

Table 3 shows that use of the sized fiber substantially increases the strain and toughness of the extruded fiber cement composite material compared to the equivalent formulation using untreated regular cellulose fibers. MOR, strain, toughness, and water absorption were measured under the equilibrium condition in accordance with ASTM (American Standard Test Method) C1185-98a entitled "Standard Test Methods for Sampling and Testing Non-Asbestos Fiber-Cement Flat Sheet, Roofing and Siding Shingles, and Clapboards." The sized fiber increases the toughness in this embodiment by more than about 5% as compared to an equivalent formulation without sized fibers. Water absorption of the fiber cement composite material is reduced by more than about 20%. The sized fiber also reduces the moisture expansion, in this embodiment, by more than about 5%.

EXAMPLE 5

In this example a bleached Kraft softwood fiber were first fiberized by a hydra-pulper into a fiber consistency of 4%. The fiberized fibers were then refined by a series of refiners to a freeness of 400 CSF to impart the fibers some fibrillation. A portion of the fibrillated fiber was used as the control and another portion was treated with sizing agent of n-octyltriethoxysilane by directly adding the chemical to the fiber after refining. The treatment was carried out at about 30° C. under atmospheric pressure. The dosage of n-octyltriethoxysilane was 10% of the fiber mass. The reaction retention was about one minute. The untreated and treated fibers, separately, were mixed with other dry ingredients to form fiber cement slurry. The fiber cement composite specimens were fabricated using a Hatschek machine. The formulation for the samples I and J was the same except different fibers were used. The formulation contained 7% fibers (the sized fiber for sample I or regular cellulose fibers for sample J), 30% Portland cement and 63% ground silica. The "green" samples were air cured for about 8 hours at ambient temperature and then cured by autoclaving at 180° C. for 12 hours. The oven dry density of Sample I and J is about 1.3 grams per centimeter.

TABLE 4

Physical Properties of Fiber Cement Composite Materials with Sized Cellulose Fibers and Regular Cellulose Fibers (the composite material samples were prepared by Hatschek process)

| Physical Properties | Samples | |
|---|---|---|
| | I (with sized fiber) | J (with regular fiber) |
| MOR (MPa) | 7.65 | 8.61 |
| Strain (μm/m) | 18078 | 15752 |
| Toughness (KJ/m$^3$) | 13.60 | 13.19 |
| Water Absorption (% wt) after 24 hours of testing | 27.5 | 30.5 |
| Rate of Water Absorption (%/hour) for first 8 hours | 3.4 | 3.8 |
| Interlaminate Bonding Strength (MPa) | 1.14 | 1.17 |

In this example, MOR, strain, toughness and water absorption were tested under the wet condition in accordance with ASTM (American Standard Test Method) C1185-98a entitled "Standard Test Methods for Sampling and Testing Non-Asbestos Fiber-Cement Flat Sheet, Roofing and Siding Shingles, and Clapboards." Table 4 shows that use of the sized fiber improves the strain and toughness energy, reduced the rate of water absorption and the amount of the water absorbed. It will be appreciated that the ultimate strain of the material according to this embodiment improves by more than about 10% as compared to an equivalent building material formulation without sized fibers. Interlaminate bonding strength is not compromised significantly. The embodiments also indicate that a reduction of about 10% or more in water absorption can be achieved for a 24 hour test. Furthermore, the rate of water of water absorption can be reduced by more than about 5% for an eight-hour test, expressed as weight percent per hour.

CONCLUSION

In general, it will be appreciated that preferred embodiments of the present invention, in particular a chemically treated cellulose fiber incorporated into a fiber cement building material, have several advantages over the prior art. These materials, made in accordance with the preferred processes and formulations, have a lower wet mass, lower rate of water absorption and lower water permeability, higher moisture resistance, higher rot resistance, and higher freeze-thaw resistance as compared to conventional fiber cement composite materials. The improved water resistance reduces the opportunity for biological agents to survive and degrade the cellulose contained in the composite material. The high water resistance will improve the problems associated with dissolution and re-deposition externally (efflorescence) and internally of the composite materials. Use of the sized fibers prepared in accordance with the embodiments of the present invention in the fiber reinforced cement composite materials can improve the ultimate strain and toughness energy of the final products.

It will be appreciated that the fiber cement formulations are selected for comparison purposes only and that a variety of other formulations can be used without departing from the scope of the present invention. In addition to fiber cement products, other cementitious materials may also use sized fibers in the formulation to improve the mechanical and physical properties of the material. It will also be appreciated that several fiber treatments such as fiber sizing, biocide treatment and fiber loading can be combined to provide the treated fiber and the fiber cement composite material with even more desirable properties.

The preferred embodiments have applicability to a number of building product applications, including but not limited to roofing, paving, exterior and interior panels, decking, piping, tile backers, siding, trim, soffits, and fencing. The embodiments illustrated and described above are provided as examples of certain preferred embodiments of the present invention. Various changes and modifications can be made from the embodiments presented herein by those skilled in the art without departure from the spirit and scope of this invention.

What is claimed is:

1. A method of manufacturing a fiber reinforced cement composite material, consisting of:
   providing unbleached cellulose fibers individualized to about 500 CSF;
   treating at least a portion of the cellulose fibers in solution with about 10% by fiber mass with one or more sizing agents in the presence of water or an organic solvent for about 1 hour at ambient temperature at 1 atm and 4% pulp consistency, wherein the sizing agent comprises a hydrophilic functional group and a hydrophobic functional group, wherein the hydrophilic group chemically bonds to at least some of the hydrophilic sites on inner and outer surfaces of the fibers to form sized fibers, wherein the sizing agent substantially blocks the hydrophilic sites, thereby reducing the fibers' affinity toward water;
   mixing about 8% by weight sized fibers with about 35% cementitious binder and about 57% ground silica to form a fiber cement mixture;
   forming the fiber cement mixture into a fiber cement article of a pre-selected shape and size;
   precuring the fiber cement article for about 8 hours at ambient temperature so as to form the fiber reinforced composite building material; and
   autoclaving the fiber cement article for about 12 hours at about 180° C.

2. A method of manufacturing a fiber reinforced cement composite material, consisting of:
   providing unbleached cellulose fibers individualized to about 500 CSF;
   treating at least a portion of the cellulose fibers in solution with about 5% by fiber mass with one or more sizing agents in the presence of water or an organic solvent for about 30 minutes at ambient temperature at 1 atm and at 4% pulp consistency, wherein the sizing agent comprises a hydrophilic functional group and a hydrophobic functional group, wherein the hydrophilic group chemically bonds to at least some of the hydrophilic sites on inner and outer surfaces of the fibers to form sized fibers, wherein the sizing agent substantially blocks the hydrophilic sites, thereby reducing the fibers' affinity toward water;
   mixing about 8% by weight sized fibers with about 35% cementitious binder and about 57% ground silica to form a fiber cement mixture;
   forming the fiber cement mixture into a fiber cement article of a pre-selected shape and size; and
   drying said article to a density of 1.3 g/cm$^3$.

3. A method of manufacturing a fiber reinforced cement composite material, consisting of:
   providing unbleached cellulose fibers individualized to about 450 CSF;
   treating at least a portion of the cellulose fibers in solution with about 10% by fiber mass with one or more sizing agents in the presence of water or an organic solvent for about 1 hour at ambient temperature at 1 atm and at 30% pulp consistency, wherein the sizing agent comprises a hydrophilic functional group and a hydrophobic functional group, wherein the hydrophilic group chemically bonds to at least some of the hydrophilic sites on inner and outer surfaces of the fibers to form sized fibers, wherein the sizing agent substantially blocks the hydrophilic sites, thereby reducing the fibers' affinity toward water;
   mixing about 8% by weight sized fibers with about 35% cementitious binder and about 57% ground silica to form a fiber cement mixture;
   forming the fiber cement mixture into a fiber cement article of a pre-selected shape and size; and
   drying said article to a density of 1.3 g/cm$^3$.

4. A method of manufacturing a fiber reinforced cement composite material, consisting of:
   providing bleached cellulose fibers individualized to about 500 CSF;
   treating at least a portion of the cellulose fibers with about 5% by fiber mass with a sizing agent consisting essentially of n-octyltriethoxysilane by spraying said bleached cellulose fibers at ambient temperature with said sizing agent,
   mixing about 10% by weight sized fibers with about 39% cementitious binder and about 39% ground silica, about 10% of at least one density modifier, and about 1.5% additives, to form a fiber cement mixture;
   extruding the fiber cement mixture to a fiber cement article of a pre-selected shape and size;
   curing the fiber cement article for about 24 hours at about 180° C., the article having a density of about 0.9 g/cm$^3$.

5. A method of manufacturing a fiber reinforced cement composite material, consisting of:
   providing bleached cellulose fibers individualized to about 400 CSF and a 4% consistency;
   treating at least a portion of the cellulose fibers with about 10% by fiber mass with a sizing agent consisting essentially of n-octyltriethoxysilane at about 30 C under 1 atm with said sizing agent, mixing about 7% by weight sized fibers with about 30% cementitious binder and about 63% ground silica to form a fiber cement mixture;
   forming the fiber cement mixture into a fiber cement article of a pre-selected shape and size; and
   precuring the fiber cement article for about 8 hours at ambient temperature; and curing the fiber cement article for about 12 hours at about 180° C., the article having a density of about of 1.3 g/cm$^3$.

* * * * *